United States Patent
Jacobson et al.

(10) Patent No.: US 10,733,312 B2
(45) Date of Patent: Aug. 4, 2020

(54) CONTEXT DRIVEN SUBSCRIPTIONS

(71) Applicant: General Electric Company, Schenectady, NY (US)

(72) Inventors: Bruce J. Jacobson, San Ramon, CA (US); Trent Gillham, New Orleans, LA (US); Patrick Bergeron, New Orleans, LA (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 15/720,782

(22) Filed: Sep. 29, 2017

(65) Prior Publication Data

US 2018/0096159 A1  Apr. 5, 2018

Related U.S. Application Data

(60) Provisional application No. 62/402,148, filed on Sep. 30, 2016.

(51) Int. Cl.
*G11C 17/00* (2006.01)
*G06F 13/00* (2006.01)
(Continued)

(52) U.S. Cl.
CPC ......... *G06F 21/6218* (2013.01); *G06Q 10/06* (2013.01); *G06Q 50/02* (2013.01); *G06Q 50/06* (2013.01)

(58) Field of Classification Search
CPC .... G06F 21/6218; G06Q 10/06; G06Q 50/02; G06Q 50/06
(Continued)

(56) References Cited

U.S. PATENT DOCUMENTS 6,243,483 B1 *  6/2001  Petrou ................ F17D 5/00
                                               348/144
8,327,419 B1 * 12/2012  Korablev ............ G06F 21/6218
                                               707/728
(Continued)

FOREIGN PATENT DOCUMENTS

GB    2535597 A    8/2016
WO    2013/120209 A1   8/2013

OTHER PUBLICATIONS

Zhiguo Wan; HASBE: A Hierarchical Attribute-Based Solution for Flexible and Scalable Access Control in Cloud Computing; IEEE Transactions on Information Forensics and Security, vol. 7, No. 2, Apr. 2012 (Year: 2012).*

(Continued)

*Primary Examiner* — Monjur Rahim
(74) *Attorney, Agent, or Firm* — Mintz Levin Cohn Ferris Glovsky and Popeo, P.C.

(57) ABSTRACT

Methods, systems, and devices for context driven subscriptions are provided. In general, a user interface for a pipeline management system can be configured to provide information regarding one or more pipelines to authorized users. The information can include data gathered using one or more sensors sensing various parameters. The information on the user interface can include results of analysis of the gathered data, such as notifications that the gathered data indicates an anomaly with a pipeline. The notifications of anomalies can be provided on the user interface in real time with the data analysis.

20 Claims, 27 Drawing Sheets

(51) Int. Cl.
*G06F 17/14* (2006.01)
*G06F 12/00* (2006.01)
*G06F 21/62* (2013.01)
*G06Q 10/06* (2012.01)
*G06Q 50/02* (2012.01)
*G06Q 50/06* (2012.01)

(58) Field of Classification Search
USPC .................................................. 726/19
See application file for complete search history.

(56) References Cited

U.S. PATENT DOCUMENTS

| | | | |
|---|---|---|---|
| 2005/0038825 A1* | 2/2005 | Tarabzouni | G06Q 50/06 |
| 2009/0322544 A1* | 12/2009 | McDowell | F17D 5/06 |
| | | | 340/605 |
| 2012/0007743 A1* | 1/2012 | Solomon | G01M 3/243 |
| | | | 340/605 |
| 2013/0043887 A1* | 2/2013 | Ziolkowski | F17D 5/00 |
| | | | 324/649 |
| 2014/0196115 A1* | 7/2014 | Pelykh | H04L 63/08 |
| | | | 726/4 |
| 2015/0002300 A1* | 1/2015 | Cho | G01M 3/18 |
| | | | 340/605 |
| 2015/0033297 A1 | 1/2015 | Sans et al. | |
| 2015/0105878 A1* | 4/2015 | Jones | G06F 9/44505 |
| | | | 700/83 |
| 2015/0281239 A1* | 10/2015 | Brophy | H04L 63/10 |
| | | | 726/4 |
| 2017/0097272 A1* | 4/2017 | Zulfiquar | G01M 3/02 |
| 2018/0149552 A1* | 5/2018 | Wayman | G01N 27/82 |

OTHER PUBLICATIONS

International Search Report and Written Opinon issued in connection with corresponding PCT Application No. PCT/US2017/054751 dated Nov. 23, 2017.

Jacobson, et al., Leak Detection User Interfaces, GE Co-pending U.S. Appl. No. 62/402165, filed Sep. 30, 2016.

* cited by examiner

FIG. 3

○ APM - Pipeline Leak monitoring     Users - CIC DEMO     Powered by Predix and hifi HDS

- ● Monitor
- ○ Analyze
- 🕮 Users
- ⓘ Help

Enter User Information

| User ID | Username | Email | Company | Roles |
|---|---|---|---|---|
| b2d22a29-2fca-40b0-9106-bc36cfc9f5d3 | Name | Email address | com.cic | * |
| ae5fb75c-4741-4a40-8fa9-0ee28e04a7fd | Name | Email address | com.cic | OPERATOR |
| 63075f6d-d70d-4fcb-bd40-eec6b7e22739 | Name | Email address | com.cic | OPERATOR |
| 6aeed49d-07a2-4703-a3b1-93c73ddba692 | Name | Email address | com.cic | OPERATOR |
| 8a0ccb2d-0a99-42dd-bbf5-a8c4aef60804 | Name | Email address | com.cic | OPERATOR |
| a06256c8-a958-453a-8489-27a0d8b7c481 | Name | Email address | com.cic | OPERATOR |
| 3b71da0c-9028-4eb2-866d-a82b5ba65af7 | Name | Email address | com.cic | OPERATOR |
| 484cc474-5b1c-4aec-8e0b-fad5b5f69311 | Name | Email address | com.cic | OPERATOR |
| b53d7cb9-f31a-4aad-94a0-551dcaa7e3cf | Name | Email address | com.cic | OPERATOR |
| 2f506510-8c72-4fee-95bb-397b26ff4e75 | Name | Email address | com.cic | OPERATOR |
| 28cc2fb9-76b6-4c51-bd51-4a7b8412bbca | Name | Email address | com.cic | ADMIN |
| 63227942-f84f-4a73-8144-af8c0243a327 | Name | Email address | com.cic | USER |
| 87983836-aa81-4b8d-8d7f-10f612cc0d3c | Name | Email address | com.cic | USER |
| c4492b82-647a-4d60-a3f0-ef56118ab3d1 | Name | Email address | com.cic | USER |

FIG. 7

APM - Pipeline Leak monitoring | Users - CIC DEMO | Powered by Predix and hifi HDS

- Monitor
- Analyze
- Users
- Help

Enter User Information

Add Users

Start Registration Process

Emails
Enter emails

Roles
USER ▼

[Send Registration Email]    [Close]

| User ID | Company | Roles |
|---|---|---|
| b2d22a29-2fca-40b0-9106-bc36cf | com.cic | * |
| ae5fb75c-4741-4a40-8fa9-0ee28e | com.cic | OPERATOR |
| 63075f6d-d70d-4fcb-bd40-eec6b7 | com.cic | OPERATOR |
| 6aeed49d-07a2-4703-a3b1-93c73 | com.cic | OPERATOR |
| 8a0ccb2d-0a99-42dd-bbf5-a8c4ae | com.cic | OPERATOR |
| a06256c8-a958-453a-8489-27a0d | | |
| 3b71da0c-9028-4eb2-866d-a82b5ba65af7 | com.cic | OPERATOR |
| 484cc474-5b1c-4aec-8e0b-fad5b5f69311 | com.cic | OPERATOR |
| b53d7cb9-f31a-4aad-94a0-551dcaa7e3cf | com.cic | OPERATOR |
| 2f506510-8c72-4fee-95bb-397b26ff4e75 | com.cic | OPERATOR |
| 28cc2fb9-76b6-4c51-bd51-4a7b8412bbca | com.cic | ADMIN |
| 63227942-f84f-4a73-8144-af8c0243a327 | com.cic | USER |
| 87983836-aa81-4b8d-8d7f-10f612cc0d3c | com.cic | USER |
| c4492b82-647a-4d60-a3f0-ef56118ab3d1 | com.cic | USER |

FIG. 8

APM - Pipeline Leak monitoring

Users - CIC DEMO

Powered by Predix and hifi HDS

- Monitor
- Analyze
- Users
- Help

Enter User Information

Edit Users

| User ID | |
|---|---|
| b2d22a29-2fca-40b0-9106-bc36cfc9f5d3 | |

Username

Name

Email

Email address

Roles
USER ▼

Save Changes          Delete User

Close

| User ID | | | Company | Roles |
|---|---|---|---|---|
| b2d22a29-2fca-40b0-9106-bc36cf | | | com.cic | * |
| ae5fb75c-4741-4a40-8fa9-0ee28e | Username | Email address | com.cic | OPERATOR |
| 63075f6d-d70d-4fcb-bd40-eec6b7 | Name | Email address | com.cic | OPERATOR |
| 6aeed49d-07a2-4703-a3b1-93c73 | Name | Email address | com.cic | OPERATOR |
| 8a0ccb2d-0a99-42dd-bbf5-a8c4ae | | | com.cic | OPERATOR |
| a06256c8-a958-453a-8489-27a0d | | | com.cic | OPERATOR |
| 3b71da0c-9028-4eb2-866d-a82b5 | | | com.cic | OPERATOR |
| 484cc474-5b1c-4aec-8e0b-fad5b5 | | | com.cic | OPERATOR |
| b53d7cb9-f31a-4aad-94a0-551dcaa7e3cf | Name | Email address | com.cic | OPERATOR |
| 2f506510-8c72-4fee-95bb-397b26ff4e75 | Name | Email address | com.cic | OPERATOR |
| 28cc2fb9-76b6-4c51-bd51-4a7b8412bbca | Name | Email address | com.cic | ADMIN |
| 63227942-f84f-4a73-8144-af8c0243a327 | Name | Email address | com.cic | USER |
| 87983836-aa81-4b8d-8d7f-10f612cc0d3c | Name | Email address | com.cic | USER |
| c4492b82-647a-4d60-a3f0-ef56118ab3d1 | Name | Email address | com.cic | USER |

FIG. 9

Star role

User management com-Current users

| Selected (0) | ID | User name | Emails | Company △ | Roles |
|---|---|---|---|---|---|
| | Filter | Filter | Filter | Filter | Filter |
| ☐ | a83ccd3a-1b26-48cf-9903-225ea436e099 | allison | allison.luzader@ge.com | com | * |
| ☐ | ad98bfd8-f26b-4f38-a304-392ed7297bd4 | admin | admin@ge.com | com | Admin |
| ☐ | a19659do-fda7-457e-9168-8c6d03a312ff | patrick.bergeron | patrick.bergeron@ge.com | com | * |
| ☐ | 07c81455-4340-4298-b466-d487c70cc80e | trent.gillham | trent.gillham@ge.com | com | * |
| ☐ | fff717a3-f245-40cb-8676-dd654daf8dd1 | test.star | test.star@ge.com | com | * |
| ☐ | 39cefb2f-9af4-42b9-9c96-6e7f17f26921 | test.operator | test.operator@ge.com | com.ge | Operator |
| ☐ | a8d7833a-a855-46a9-ba9d-55fc63782916 | test.admin | test.admin@ge.com | com.ge | Admin |
| ☐ | aa3eaa70-faa9-4120-8de1-cebb816c0d9a | bruce.jacobson | bruce.jacobson@ge.com | com.ge | Demo |
| ☐ | 47caa8c4-0a6f-43c7-9494-c513c91d6fc0 | operator.ge | operator.ge@ge.com | com.ge | Operator |
| ☐ | f02fc436-906c-4612-a8a8-ae3271c91b66 | test.demo | test.demo@ge.com | com.ge | Demo |

Rows per page 10 ∨  ❶ 2 >

Selected user (0) [Delete]

*
Admin
Demo
Operator
Analyst
User

[User ∨]

Add new users

| User name | Email | Password | Company |
|---|---|---|---|
| Enter username | Enter email | Enter password | Company.name |

[Add user]

Leak detection
○ Monitor
○ Prevent
⊗ Users
⌂ Companies test.star

Powered by predix and hifi HDS

⊗ LOGGED ALARMS    Export to Excel

| Event ID | Event Type | Start Time | End Time | Duration | Acknowledged | Logged | Post | GPS | Comments |
|---|---|---|---|---|---|---|---|---|---|
| | Filter | Filter | Filter | Filter | Filter | Filter | Filter | Filter | |
| 88 | Leak | Date, Time | Date, Time | 00:15:00 | Date, Time | Date, Time | 160.15km | Coordinates | View |
| 89 | Acoustic | Date, Time | Date, Time | 00:00:45 | Date, Time | Date, Time | 724.82km | Coordinates | View |
| 90 | Temperature | Date, Time | Date, Time | 00:40:04 | Date, Time | Date, Time | 709.00km | Coordinates | View |
| 91 | Strain | Date, Time | Date, Time | 00:00:30 | Date, Time | Date, Time | 745.48km | Coordinates | View |
| 92 | Instrusion | Date, Time | Date, Time | 00:00:23 | Date, Time | Date, Time | 770.72km | Coordinates | View |
| 93 | Temperature | Date, Time | Date, Time | 00:00:32 | Date, Time | Date, Time | 780.23km | Coordinates | View |

Rows per page [5 ⌄]    21-30 of 80    < 1 ❷ 3 4 5 _ 8 >

FIG. 28

⊗ LOGGED ALARMS

| Event ID | Event Type | Start Time | End Time | Duration | Acknowledged | Logged | Post | GPS | | Comments |
|---|---|---|---|---|---|---|---|---|---|---|
| | Filter | Filter | Filter | Filter | Filter | Filter | Filter | Filter | Export to Excel | |
| 88 | Leak | Date, Time | Date, Time | 00:15:00 | Date, Time | Date, Time | 160.15km | Coordinates | | View |
| 89 | Acoustic | Date, Time | Date, Time | 00:00:45 | Date, Time | Date, Time | 724.82km | Coordinates | | View |
| 90 | Temperature | Date, Time | Date, Time | 00:40:04 | Date, Time | Date, Time | 709.00km | Coordinates | | View |
| 91 | Strain | Date, Time | Date, Time | 00:00:30 | Date, Time | Date, Time | 745.48km | Coordinates | | View |
| 92 | Instrusion | Date, Time | Date, Time | 00:00:23 | Date, Time | Date, Time | 770.72km | Coordinates | | View |
| 93 | Temperature | Date, Time | Date, Time | 00:00:32 | Date, Time | Date, Time | 780.23km | Coordinates | | View |

Rows per page  5 ⌄    21-30 of 80    < 1 ② 3 4 5 _ 8 >

CONTEXT DRIVEN SUBSCRIPTIONS

CROSS-REFERENCE TO RELATED APPLICATIONS

This application claims priority to U.S. Provisional Patent Application No. 62/402,148 entitled "Methods, Systems, And Devices For Context Driven Subscriptions," filed Sep. 30, 2016, which is hereby incorporated by reference in its entirety.

BACKGROUND

Pipelines are commonly used to transport fluids over long distances that can range from tens to hundreds of kilometers. This includes pipelines being used to carry crude petroleum and natural gas from one location to another, such as from an oil well to a refinery for processing. In addition, pipelines can also be used to transport sewage and slurry from refineries.

Pipelines may be susceptible to leaks due to a number of factors, including wear and tear, accidents, and natural calamities. Loss of fluids due to leakage in the pipelines can result in the loss of revenue, which can be a significant amount reaching, at times, into the hundreds of millions of dollars. Additionally, pipeline leakage can adversely affect the environment. Therefore, it may be important to detect leakage in the pipelines.

A fluid distribution network can include multiple pipelines. Sensor data from each pipeline may result in a large amount of data, so personnel monitoring the pipelines via a user interface may be presented with a large amount of information via the user interface that may be difficult to effectively monitor in a timely fashion. Further, only a subset of the pipelines in the network may be a particular user's responsibility to monitor, but it can be difficult for the user to observe only that relevant data among a large amount of available pipeline data.

SUMMARY

Methods, systems, and devices for context driven subscriptions are provided.

In one embodiment, a pipeline management system includes a memory storing instructions, and a display configured to show a user interface thereon. The system also includes a processor configured to execute the instructions in the memory and thereby receive data indicative of one or more parameters sensed at a pipeline with fluid flowing therethrough, determine which of the data is associated with a logged-in user of the user interface, and cause the determined data to be presented on the user interface.

The pipeline management system can have any number of variations. In one embodiment, the processor can determine which of the data is associated with the logged-in user based on a hierarchical role of the user. The processor can further be configured to receive a request from the user via the user interface requesting a credential level edit of another user of the user interface, determine whether the user has a credential level allowing the request to be implemented, and, in response to determining that the user has a credential level allowing the request to be implemented, change the credential level of the other user. In certain embodiments, the fluid flowing through the pipeline can include one of natural gas and petroleum. In other aspects, the pipeline management system can include a client terminal that includes the display, and the client terminal can include one of a desktop computer, a workstation, a minicomputer, a laptop computer, a tablet computer, and a smart mobile phone.

In one embodiment, a pipeline management method is provided that includes receiving data indicative of one or more parameters sensed at a pipeline with fluid flowing therethrough, determining which of the data is associated with a logged-in user of a user interface, and causing the determined data to be presented on the user interface.

The method can have any number of variations. In one embodiment, determining which of the data is associated with the logged-in user can be based on a hierarchical role of the user. In certain embodiments the method can include receiving a request from the user via the user interface requesting a credential level edit of another user of the user interface, determining whether the user has a credential level allowing the request to be implemented, and, in response to determining that the user has a credential level allowing the request to be implemented, changing the credential level of the other user. In certain embodiments, the fluid flowing through the pipeline includes one of natural gas and petroleum. In other aspects, the user interface can be shown on a display, and a processor can perform the receiving, the determining, and the causing by executing instructions stored in a memory. A client terminal can include the display, and the client terminal can include one of a desktop computer, a workstation, a minicomputer, a laptop computer, a tablet computer, and a smart mobile phone.

Non-transitory computer program products (e.g., physically embodied computer program products) are also provided that store instructions, which when executed by one or more data processors of one or more computing systems, cause at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

BRIEF DESCRIPTION OF THE DRAWINGS

This disclosure will be more fully understood from the following detailed description taken in conjunction with the accompanying drawings, in which:

FIG. 3 illustrates an exemplary embodiment of a monitor dashboard of a user interface of a pipeline management system, the dashboard including unacknowledged alarms;

FIG. 7 illustrates an exemplary embodiment of a user page of a user interface of a pipeline management system;

FIG. 8 illustrates an exemplary embodiment of a user registration window in the user page of a user interface of a pipeline management system;

FIG. 9 illustrates an exemplary embodiment of an edit window in the user page of a user interface of a pipeline management system;

FIG. 11 illustrates an exemplary embodiment of a user management window of a context browser of a user interface of a pipeline management system configured for a "Star" user role;

FIG. 12 illustrates an exemplary embodiment of a user management window of a context browser of a user interface of a pipeline management system configured for an "Admin" user role;

FIG. 28 illustrates an exemplary embodiment of a regular card showing logged alarm data;

FIG. 29B illustrates a bottom portion of the user interface of FIG. 29A;

FIG. 30 illustrates an exemplary embodiment of the user interface of FIG. 15 in full screen view;

Figure 1:
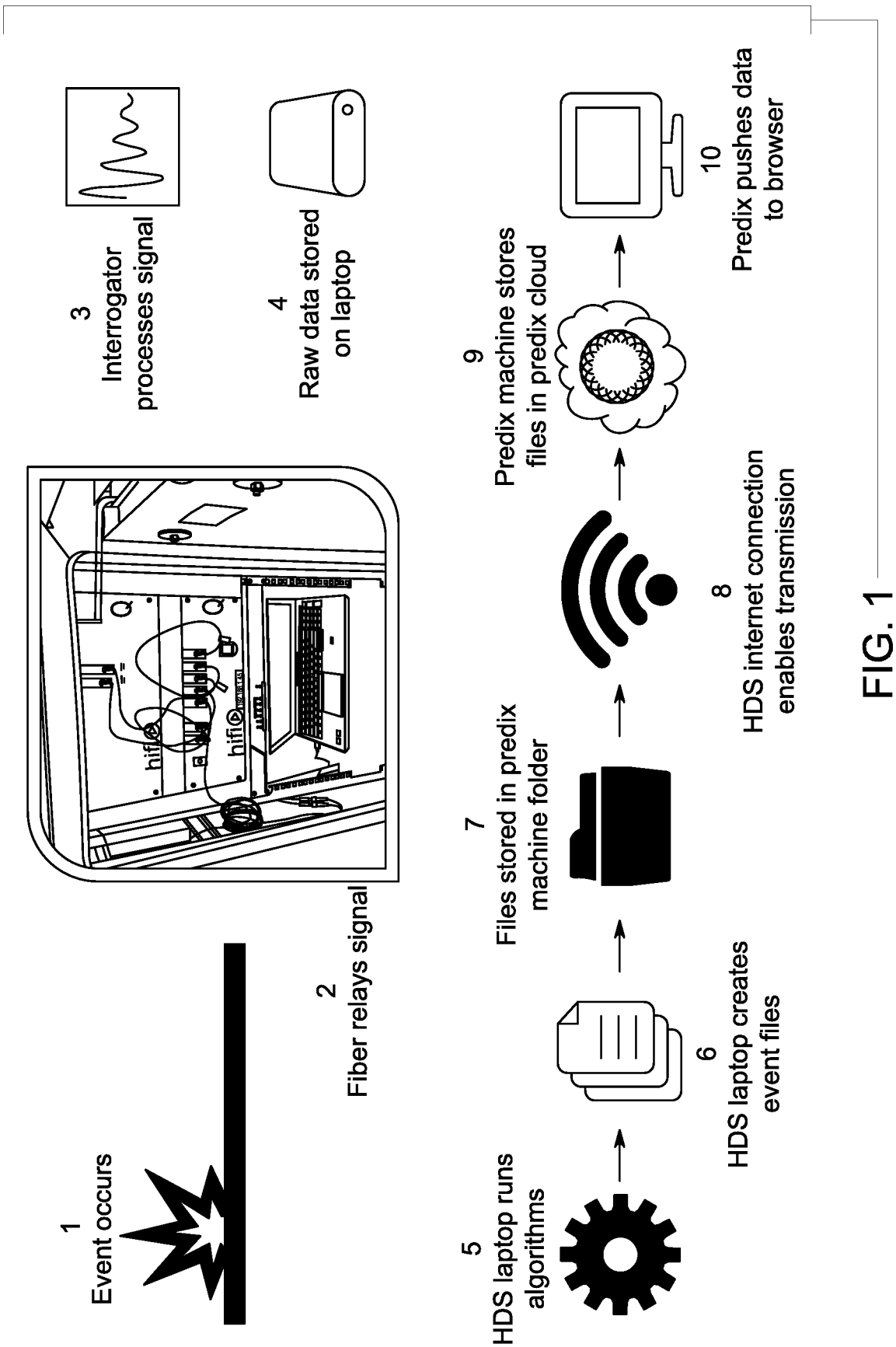
FIG. 1 is a schematic representation of an exemplary embodiment of a pipeline management system.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings.

The present disclosure relates generally to methods, systems, and devices for context driven subscriptions.

Pipelines may be used to transport fluids such as natural gas or petroleum. People often want to monitor the pipeline to help make sure that there are no problems with the pipeline, such as leaks. However, different people monitoring the pipeline may not need all the same information related to the pipeline in order to do their job. It can therefore be helpful to tailor the information shown to each individual person on a display screen based on their role so that the person can more easily find and analyze the information they need to help efficiently monitor pipelines and allow any problems with the pipelines to be quickly identified and addressed.

In general, a user interface for a pipeline management system can be configured to provide information regarding one or more pipelines to authorized users. The information can include data gathered using one or more sensors sensing various parameters, e.g., sensors placed along the pipeline and conveying sensed information to personnel monitoring the pipelines. The information on the user interface can include results of analysis of the gathered data, such as notifications that the gathered data indicates an anomaly with a pipeline. Examples of anomalies include leaks, intrusions, strain, acoustic events, and rapid temperature changes. The notifications of anomalies can be provided on the user interface in real time with the data analysis, which may allow the user monitoring the user interface to be quickly informed of the anomaly. Accordingly, the user can trigger one or more corrective actions such as notifying maintenance personnel local to a location of the identified anomaly, remotely controlling the pipeline with the anomaly to close valve(s) and/or other equipment to prevent fluid flow in the pipeline in the area of the detected anomaly, etc. The gathered information and the notifications of anomalies can be presented on the user interface in a manner that allows for quick viewing and understanding by the user, and that provides options for allowing the user to access more detailed information. The gathered information and the notifications of anomalies shown via the user interface can be arranged and presented in a manner tailored to a role of the user (e.g., a permission level of the logged-on user) or an affiliation of the user (e.g., client company with which the user is affiliated) such that different users with different roles and/or affiliation are allowed to access different information, which may help users receive only data that is most relevant to their particular role in pipeline monitoring.

FIG. 1 is a schematic representation of an exemplary embodiment of a pipeline management system that includes a user interface configured to facilitate user monitoring and management of at least one pipeline. When an event (e.g., leaks, intrusions, strain, acoustic events, and rapid temperature changes in the pipelines) occurs, a fiber optic cable typically conveys a signal to a client terminal (e.g., desktop computer, workstation minicomputer, laptop computer, tablet computer, personal digital assistant, smart mobile phone, smart watch, etc.) where the signal is processed and raw data associated with the event signal stored. Event files can be generated from the raw data and the files can be stored in a folder, such as an operating system machine folder (e.g., a Fredix™ operating system machine folder), and transmitted to a cloud folder, such as a Fredix™ operating system cloud folder, for cloud storage. The cloud folder can serve as a database for storage of event files of a one or more pipelines associated with one or more clients of the pipeline management system. Co-locating event file data of multiple clients in the cloud folder may reduce costs and/or increase efficiency of managing the database of the pipeline management system.

Data associated with the event files can be pushed to a user interface of a client terminal for display to the client's personnel. The user interface of the client terminal can be configured to allow the client's personnel to access event file data of only those pipelines for which they have been granted access. The client can be an organization (e.g., a corporation, a management company, etc.) associated with a plurality of individuals (e.g., employees, contractors, etc.) serving different roles within the organization. An administrator in the organization can determine the access rights of the individuals to the user interface. The identity and/or role of a user can be electronically verified (e.g., through passcode protection, biometric verification, radio frequency identification (RFID), etc.), and based on their identified access rights, the user's access to the event files data of the organization can be determined, such as by a processor configured to cause the display of information on the user interface.

Figure 2:
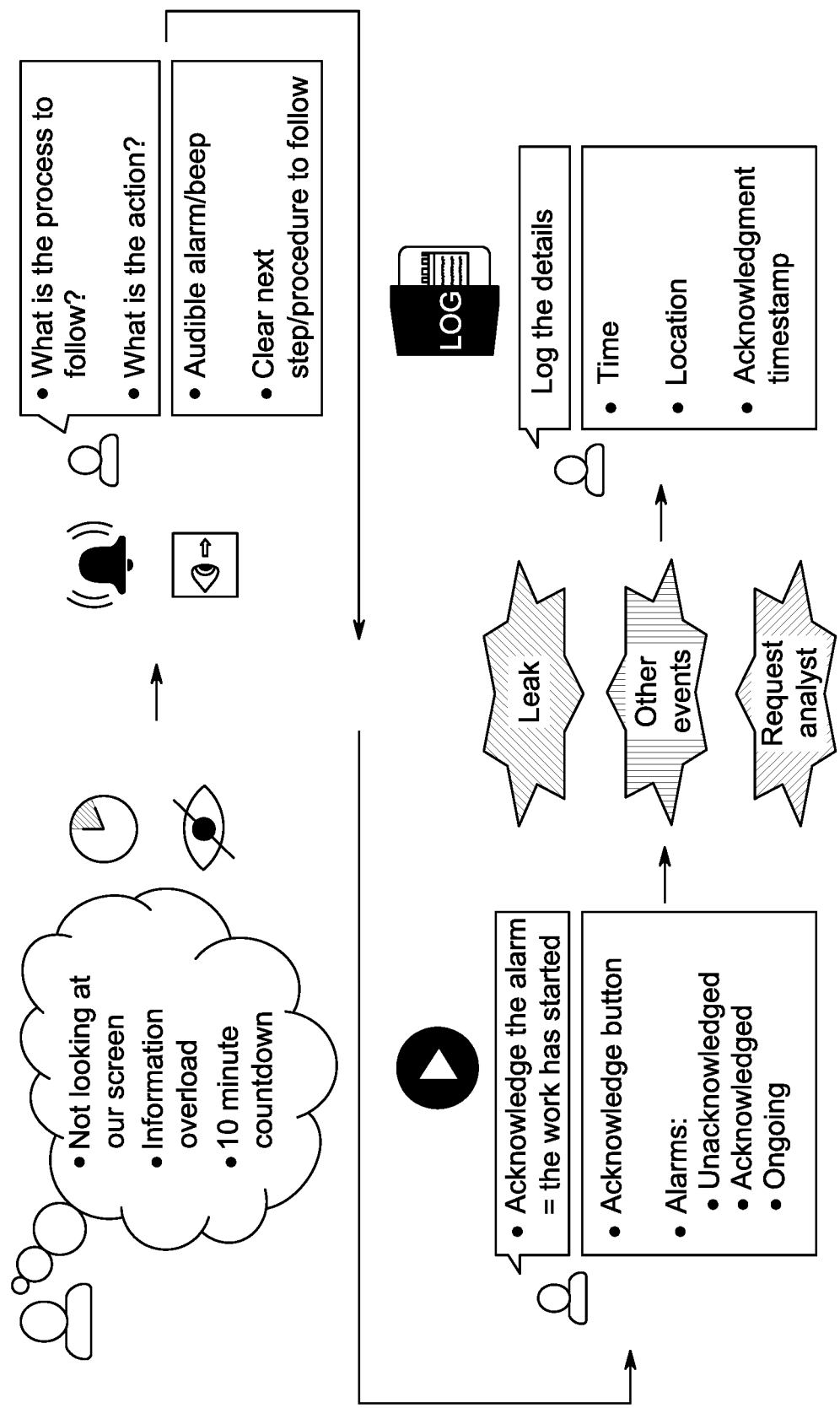
FIG. 2 is a schematic representation of an exemplary embodiment of a presentation of alarm signal and detection of user response through a user interface of a pipeline management system.

FIG. 2 illustrates an exemplary embodiment of a presentation of an alarm signal and the detection of a user response through a user interface of a pipeline management system. A user monitoring a user interface may not be able to respond quickly to an anomalous event due to any one or more various reasons, such as information overload or time lag in noticing the event's occurrence. Embodiments of user interfaces described herein may present an alarm signal associated with an anomalous event to the user, such as through an audible alarm and/or a discernable visual display of alarm signal. The user interface can allow the user to acknowledge the alarm via the user interface and can then, in response to the acknowledgement, present to the user via the user interface guidelines to respond efficiently by either performing an action or by requesting another person (maintenance personnel, another user of the user interface with higher access rights that the user, etc.) to respond to the alarm. The user interface can also allow the user to input details of the steps taken to resolve the anomalous event in an event log that can be stored in a database operatively coupled to the user interface. The user interface may thereby help prevent problems arising from a user's inability to respond quickly to an anomalous event. The user interface can be configured to present alarm signals of only those pipelines that are associated with the user and/or the client terminal through which the alarm signal is being provided.

Figure 3:
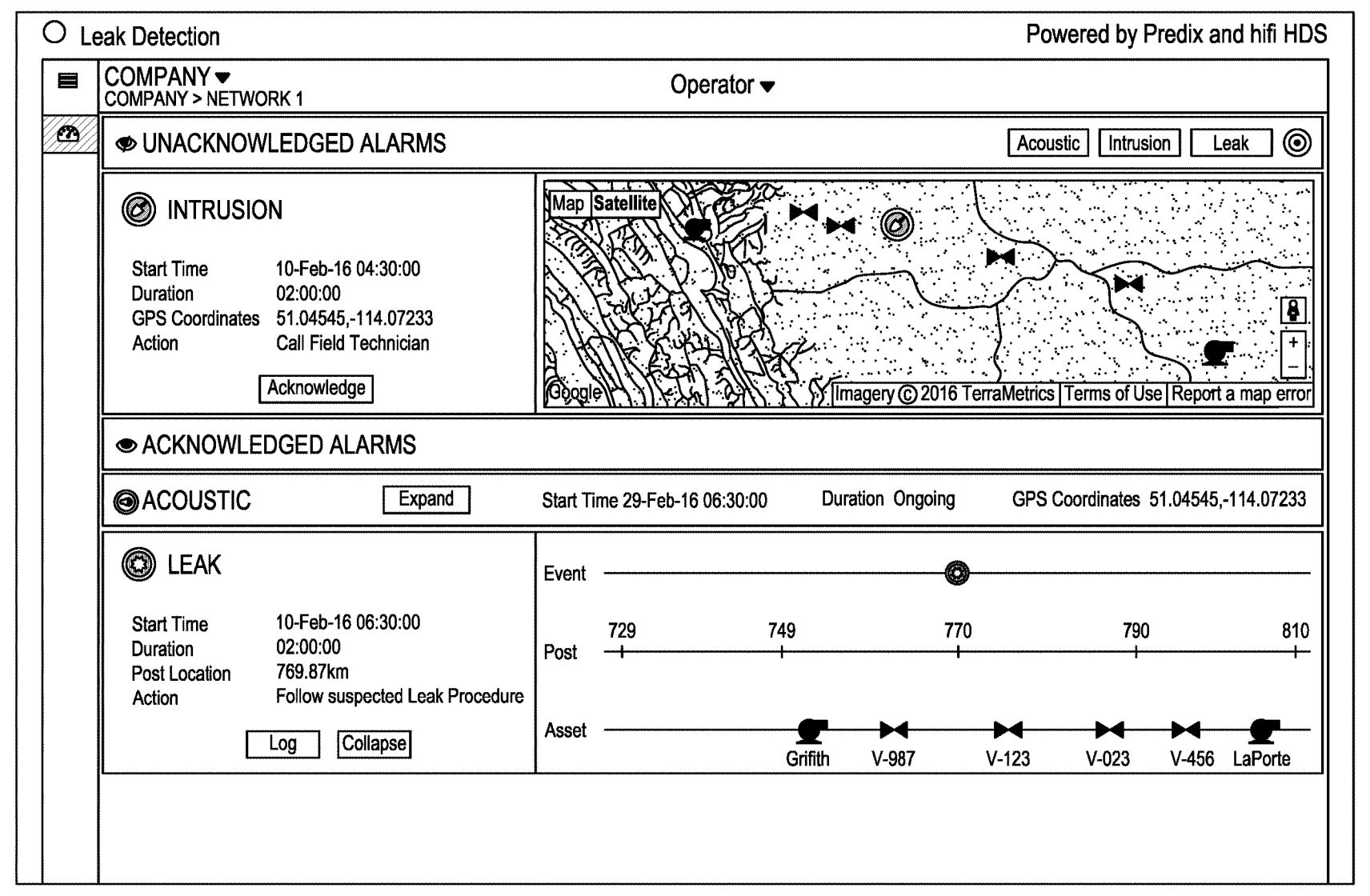
Figure 4:
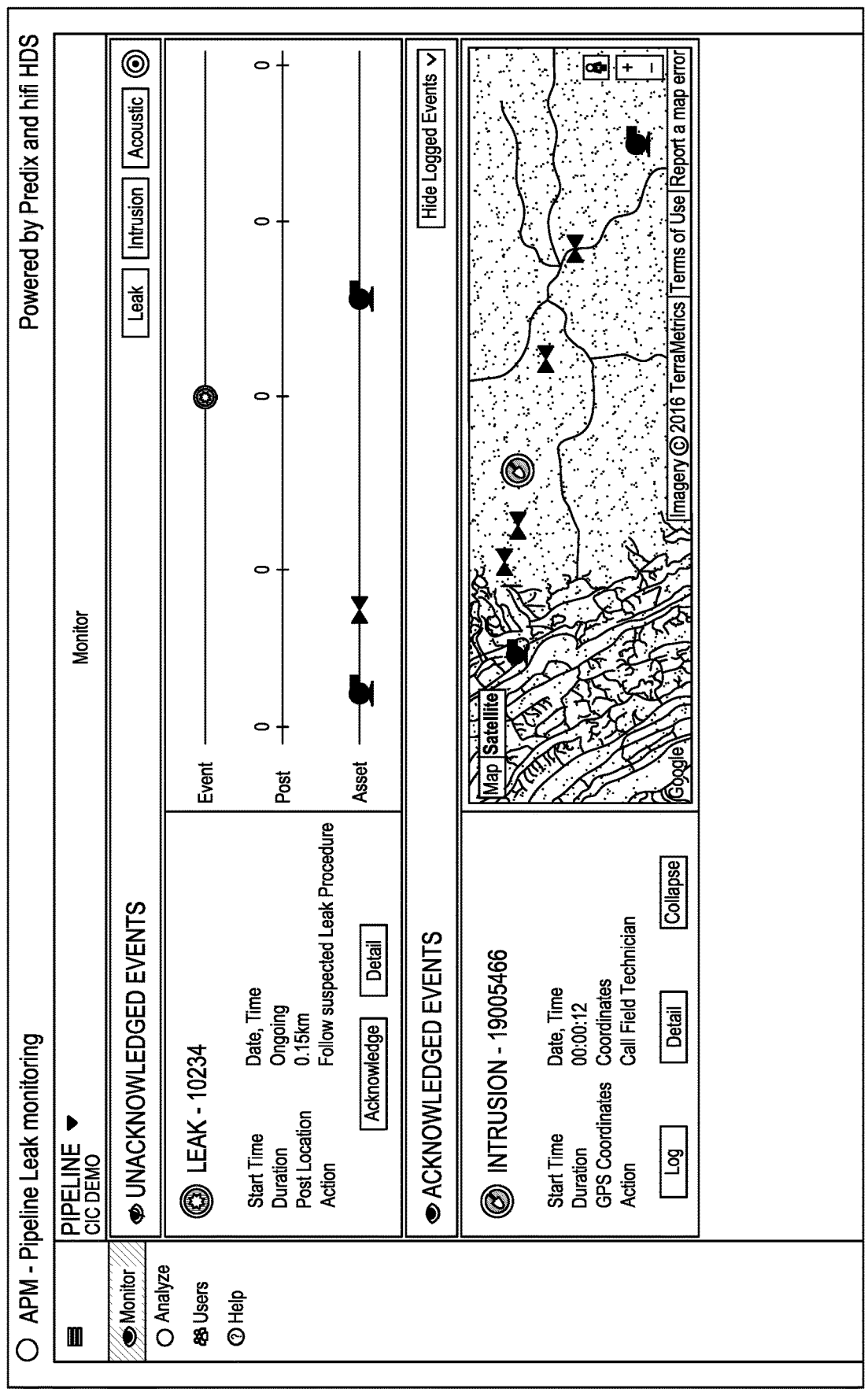
FIG. 4 illustrates another exemplary embodiment of a monitor dashboard of a user interface of a pipeline management system, the dashboard including acknowledged alarms.

A user interface of a pipeline management system can include a context browser, a prevent page (also referred to herein as an "analyze page"), and a user page. FIGS. 3-9 illustrate various exemplary embodiments of a context browser, an analyze page, and a user page. The context browser can allow the user to navigate through the context of alarms representing anomalous events in one or more pipelines. The analyze page can present data related to the anomalous events to the user. The user page can allow management of a user database associated with the user interface. Through the user page, new users can be registered and their access rights or credentials (e.g., operator, analyst, administrator, etc.) recorded by a logged-in user with a permission level permitting such editing. At least some embodiments of the user interface can include an information bar, which may be located horizontally near a top of the user interface, that can display information of pipelines under observation (e.g., owner company of the pipeline, identification number, etc.), credentials of the user of the user interface (e.g., operator, analyst, administrator, etc.), and the operation being performed (e.g., monitoring or analyzing the anomaly event, user data management, etc.). The user interface can also include a menu or side bar that can be selectively minimized (as shown in FIG. 3) to hide tabs, and it can be expanded (as shown in FIG. 4) to display the tabs that can allow the user to navigate among the context browser, the analyze page, and the user page.

FIG. 4 illustrates an exemplary embodiment of the context browser of the user interface. The context browser can be accessed by clicking a "Monitor" tab located in the user interface's side bar. When an anomalous event occurs, a notification can be shown on the context browser. The anomalous event at a pipeline can be determined to have occurred in any of a variety of ways, as will be appreciated by a person skilled in the art, such as analysis of data sensed by sensor(s) positioned along the pipeline, e.g., fiber optic sensing technology operatively coupled to the pipeline along the length of the pipelines. The context browser can present the nature of the anomalous event (e.g., leak, intrusion, acoustic event, etc.), information associated with the anomalous event (e.g., start time, duration, geographic location of the event, etc.) and assets (e.g., oil wells, pipelines, etc.) that are located in the vicinity of the event (e.g., at least one asset along the pipeline immediately to each of the left and right of a location of the event along the pipeline). The context browser can also or alternatively present the geographic location of the event and/or assets in the vicinity of the event overlaid on an interactive map or a satellite image obtained from, e.g., an online database such as Google Maps™. The user can interact with the map by clicking on the map, as will be appreciated by a person skilled in the art. As an example, the user can zoom in or zoom out of the map. The nature or type of the event can be displayed in the context browser by assigning unique symbols to different anomalous events, such as color-coded icons and/or different symbols (e.g., a red star icon for a leak and a yellow arrow icon for an intrusion). Additionally, or alternately, a schematic view of the event without the map can be displayed and it can show the nature of the event, the geographic location of the event, and/or the nearby assets. In at least some embodiments, the user can toggle between the schematic view and the map view.

The context browser can present a status of the event indicating whether the event has been acknowledged by the user ("Acknowledged event") or not ("Unacknowledged Event"). A user can acknowledge the event by clicking on the acknowledge tab, which changes the status of the event from "Unacknowledged" to "Acknowledged" to thereby indicate to the user and to other users of the user interface that the event has been noticed by a user who may initiate a response (e.g., corrective action) to the event. Once an event has been acknowledged, the user may choose to minimize information associated with the event by clicking on a "collapse" tab.

Figure 5:
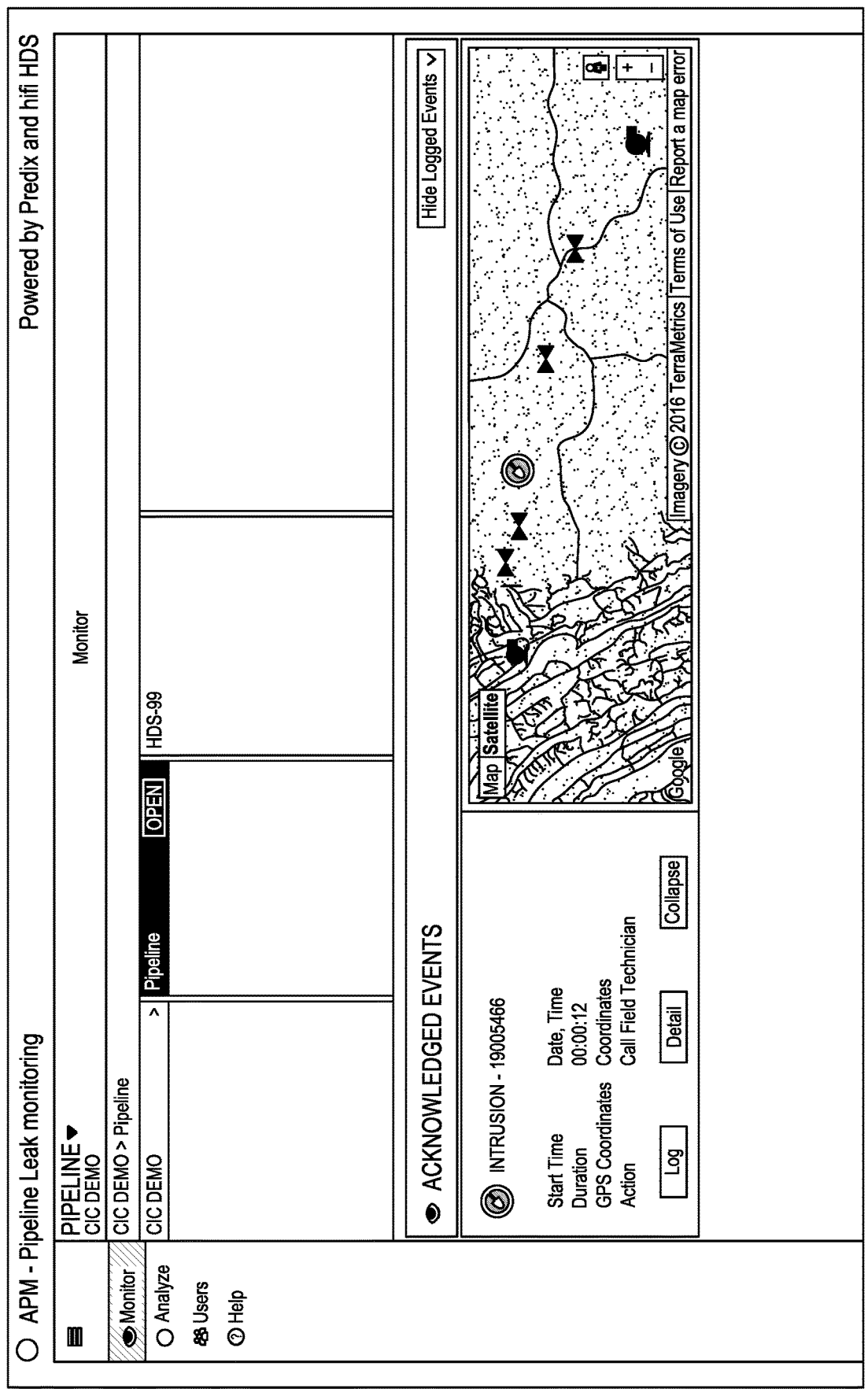
FIG. 5 illustrates an exemplary embodiment of an information bar in a context browser of a user interface of a pipeline management system that displays affiliation information of the pipeline under observation.

FIG. 5 illustrates a context browser of the user interface that can allow a user to navigate through a hierarchical menu. The hierarchy can include credentials of the user (e.g., pipeline management team (here called "CIC Demo") of which the user is a part), client name, pipeline network name, and pipeline identification. As an example, a user can navigate through the hierarchical menu to access event file data of a pipeline (here called "HDS-99") that is a part of a network of pipelines (here called "Pipeline"). In a default state, only the leftmost column (user credentials or team) can be displayed and the other columns of the hierarchical menu can be in a collapsed state. Clicking the arrow next the "CIC Demo" tab can display a second column (which includes a "Pipeline" tab), and clicking the "Pipeline" tab can display a third column that includes the "HDS-99" tab. Upon the user navigating to the pipeline "HDS-99," the user interface can display information related to one or more anomalous events associated with the HDS-99 pipeline.

Figure 6:
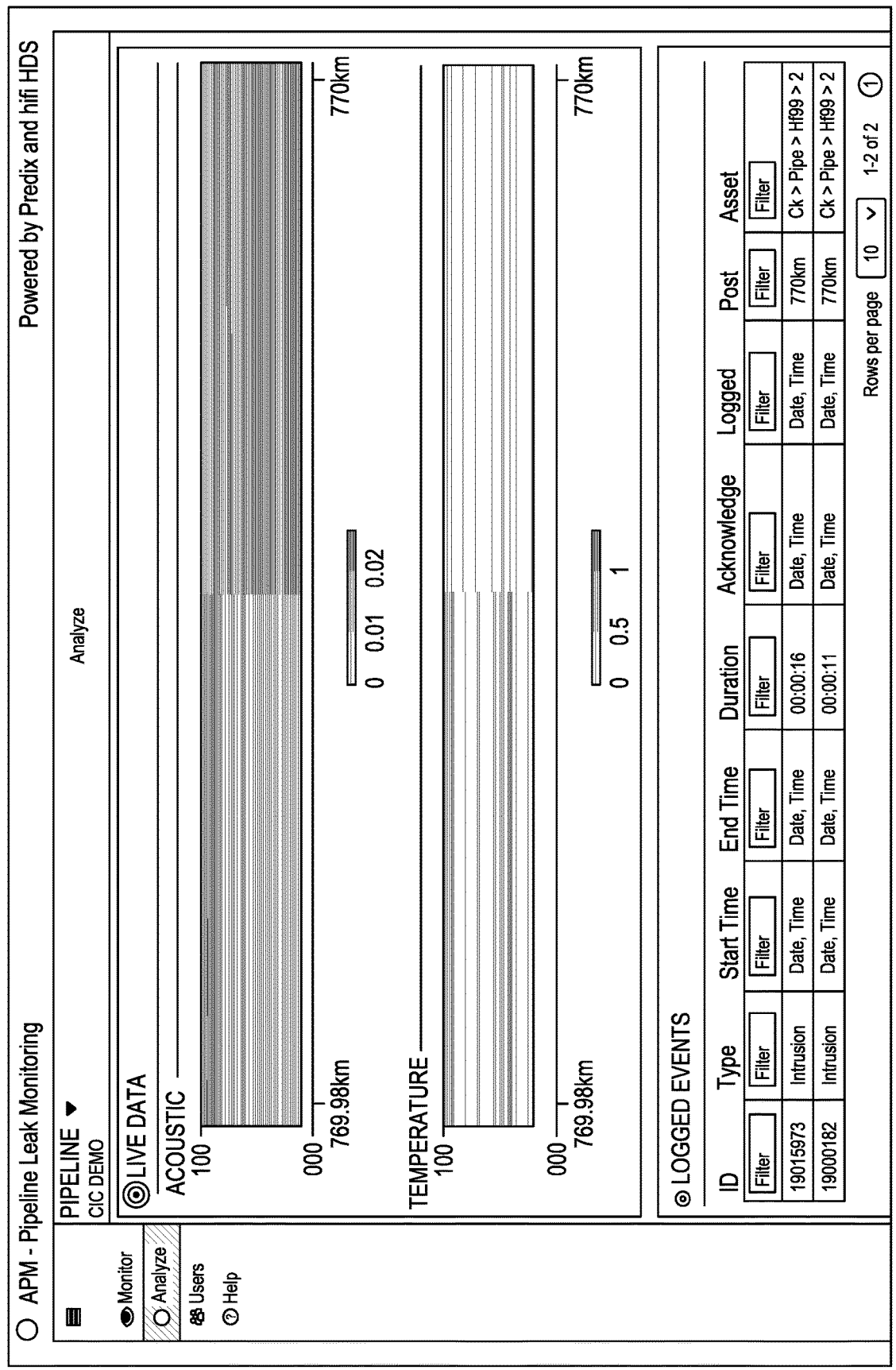
FIG. 6 illustrates an exemplary embodiment of an analyze page of a user interface of a pipeline management system.

As illustrated in FIG. 6, the user can access data that may be needed for user analysis of the anomalous event and/or analysis of data that may have been performed by a processor by clicking on an "Analyze" tab in the side bar. This can open the prevent page ("Analyze" window) where the user can access live data (e.g., acoustic data, temperature data, etc.) from one or more sensors positioned along the pipeline that experienced the anomalous event. Additionally, live data from multiple sites (e.g., other pipelines) can also be presented. Further, information associated with other detected anomalous events can be shown, such as historical events that have been recorded in an event log stored in a database.

The user can manage the user database by clicking on a "User" tab in the side bar. The user clicking on the "User" tab can open a user window, shown in FIG. 7, which can display a user identification (ID) code, name, email, company, and role of the users who have been granted access to at least a portion of the user interface. Additionally, as mentioned above, a new user can be registered in the user database through a registration window (see FIG. 8) and/or information associated with a registered user can be edited through an edit window (see FIG. 9).

Figure 10:
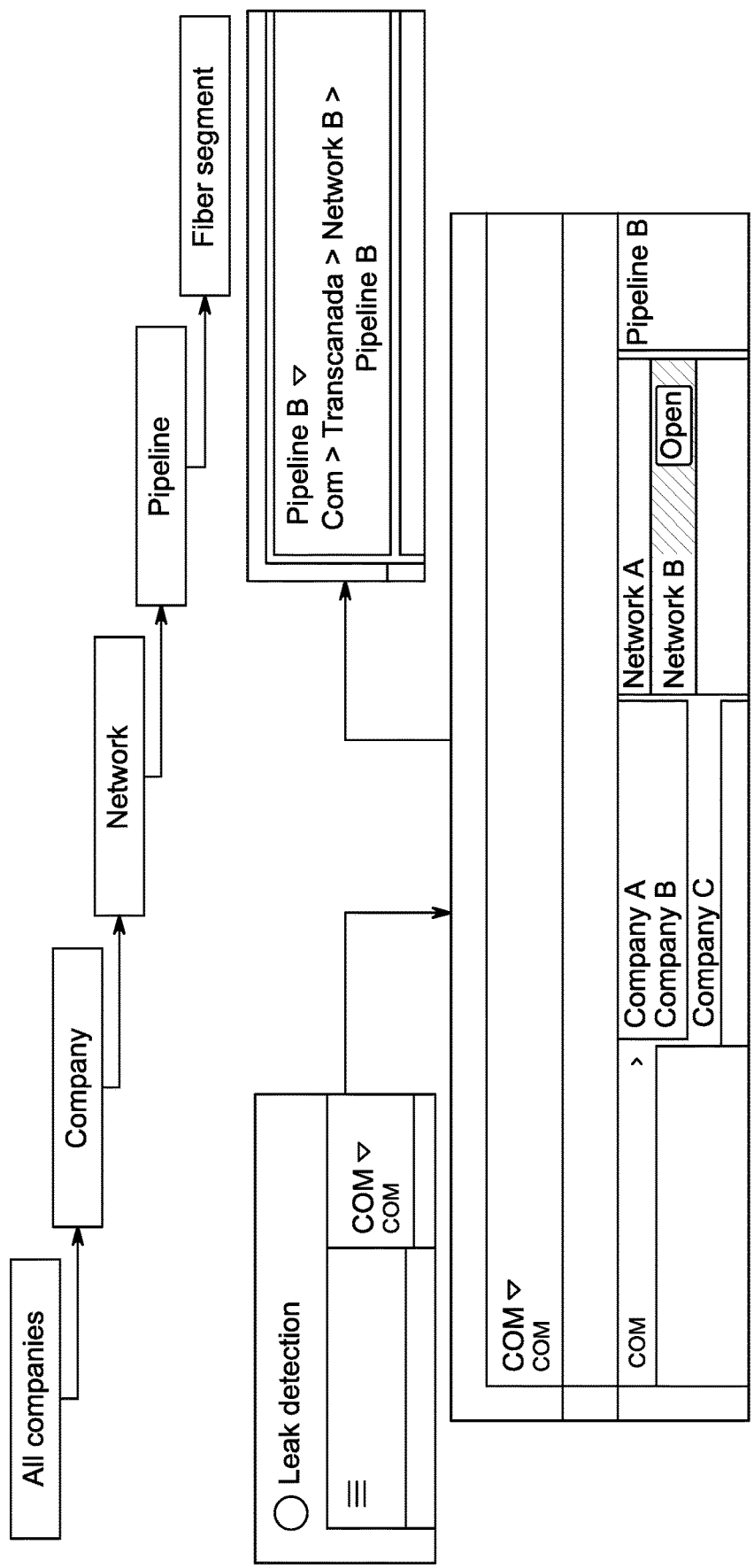
FIG. 10 illustrates an exemplary embodiment of a context browser of a user interface of a pipeline management system that displays affiliation information of a pipeline under observation.

FIG. 10 illustrates an exemplary embodiment of a context browser of a user interface that can allow a user to navigate through a hierarchical menu to access event file data of assets (e.g., pipelines). The user interface can limit the access of the user to event files of an asset based on the credentials of the user. FIG. 10 illustrates the context browser configured for a member of the pipeline management team having a "COM" or "Star" user role. In this highest level role reflective of being a management team member, the user can access via the user interface event file data of all the pipelines monitored by the pipeline management system. The context browser can include an information bar that displays credential authority of the user (e.g., "COM"). The information bar can also display hierarchical context (e.g., company, network, pipeline, etc.) of the accessed event file. As an example, as shown in FIG. 10, the "COM" user can navigate through the hierarchical menu to access event file data associated with a pipeline (e.g., "Pipeline B") that is a part of a network of pipelines (e.g., "Network B") associated with a client company ("Company C"). In a default state, only the leftmost column (e.g., "COM") can be displayed and the other columns can be in a collapsed state. Clicking the arrow next to the "COM" tab can display a second column with tabs representing client companies (e.g., Company A, Company B, Company C, etc.). Clicking the "Company C" tab can display a third column that can display tabs representing networks of pipelines associated with "Company C" (e.g., Network A and Network B). Clicking the "Network B" tab can display the pipelines that belong to the network (e.g., "Pipeline B").

FIG. 11 illustrates an exemplary embodiment of a user management window of a context browser of the user interface of FIG. 10 configured for a "Star" user. Through the user management window of FIG. 11, the "Star" user can view, add, and/or edit access information of all users of the pipeline management system and all client companies associated with the pipeline management system. As an example, the "Star" user can view the username, email address, and credentials (e.g., operator, administrator, analyst, etc.) of all users of the pipeline management system. The "Star" user can view the client company affiliation of the user and add new users to the database of the user interface and set their credentials.

Figure 12:
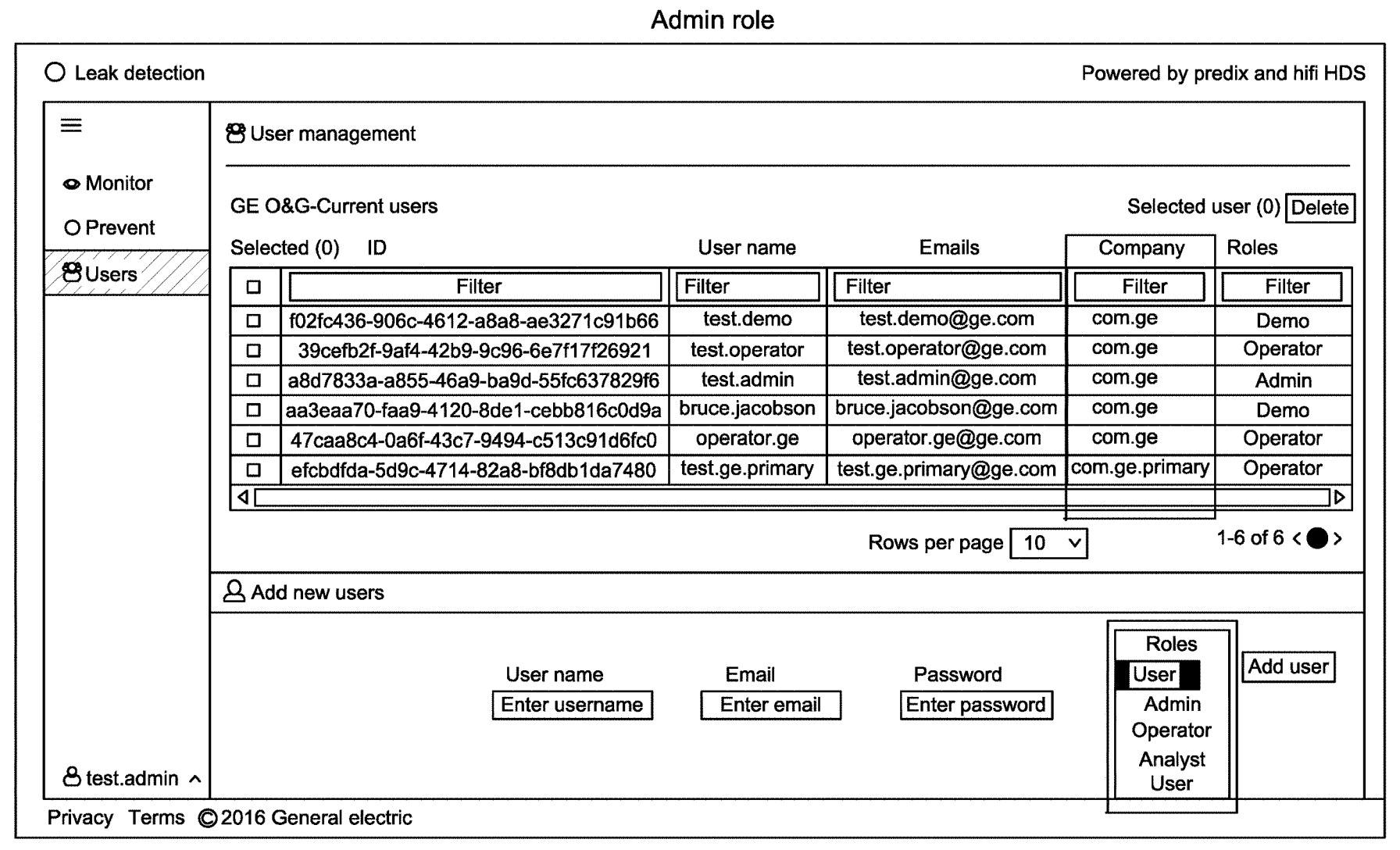

FIG. 12 illustrates an exemplary embodiment of a user management window of a context browser of the user interface of FIG. 10 configured for an "Admin" user. The "Admin" user has administrative privileges for a client company associated with the user, unlike the "Star" user who can access all data regarding all client companies. In this "Admin" user role, the user can view, add, and/or edit access information of employees of the client company. As an example, the "Admin" user can provide user interface access to an employee of the client company by adding username, email, and password information of the employee. The "Admin" user can also set the credential/role (e.g., administrator, operator, analyst, user, etc.) of the employee.

FIGS. 11 and 12 also illustrate a hierarchy associated with the credential of a user of the user interface. A "Star" user can view, add, and/or edit information of all the users of pipeline management system. In other words, as the highest level of user, the "Star" user can set credentials for a user to be at any level and can set credentials for users associated with all of the client companies associated with the pipeline management system. An "Admin" user can view, add, and/or edit information of users associated with the client company for which the "Admin" user has administrative privileges. Not being the highest level of user, the "Admin" user can add or edit credentials for users associated with the client company to be at the user's level or below. In other words, the "Admin" user cannot set a user to a "Star" user role, but can set a user to an "Admin" user role or lower. The hierarchy of the user interface can be set as follows: a "Star" user is above an "Admin" user, and an "Admin" user is above an "Operator" user, which is above an "Analyst" user.

Figure 13:
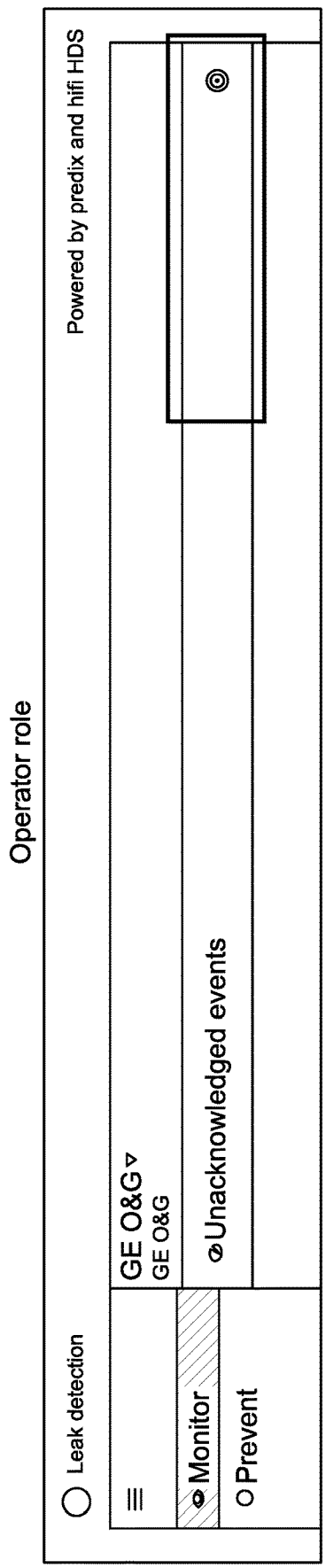
FIG. 13 illustrates an exemplary embodiment of a context browser of a user interface of a pipeline management system configured for an "Operator" user role.
Figure 14:
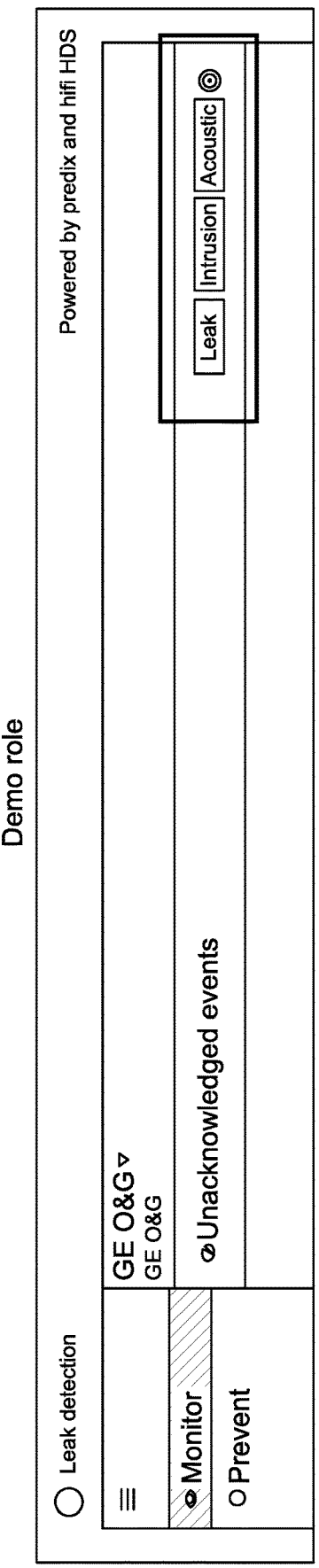
FIG. 14 illustrates an exemplary embodiment of a context browser of a user interface of a pipeline management system configured for a "Demo" user role.

In general, views of a user interface can be modified based on user role ("Operator," "Admin," etc.). In other words, the user interface can be modified based on a user's context subscription as defined by their user role. FIGS. 13 and 14 illustrate exemplary embodiments of context browsers of a user interface of an "Operator" user and "Demo" user, respectively. The Operator and Demo users have different access to the pipeline management system and, therefore, their respective context browsers have different functionalities. As an example, as shown by boxed areas in both FIGS. 13 and 14, the user interface for the "Operator" does not have access to trigger buttons (e.g., leaks, intrusion, acoustic, etc.) while the user interface for the "Demo" does have access to trigger buttons. As another example, the user interface for one role (e.g., "Analyst") can be configured to show a certain amount of gathered data relevant to that role's function, and the user interface for a higher user role (e.g., "Operator") can show a larger amount of data than the lower level user can see on the user interface since that role may involve making decisions based on a larger and/or different data set. As yet another example, the user interface for one role (e.g., "Admin") can show all available data fields, and the user interface for a lower user role (e.g., "Operator") can show only a subset of the data fields that the higher level user can see on the user interface for any of a number of reasons, such as data security. As still another example, the user interface for one role (e.g., "Star") can show an "action" button that can be clicked to trigger a corrective action, and the user interface for a lower user role (e.g., "Operator") may show the "action" button" but in a disabled state such that the button cannot be clicked on by the user to trigger the corrective action such that the lower level user can know that corrective action may be possible but that another user needs to trigger the corrective action.

FIGS. 15-40 provide aspects of an exemplary embodiment of a pipeline management system including a user interface configured to facilitate a user's monitoring and analysis of a pipeline system.

Figure 15:
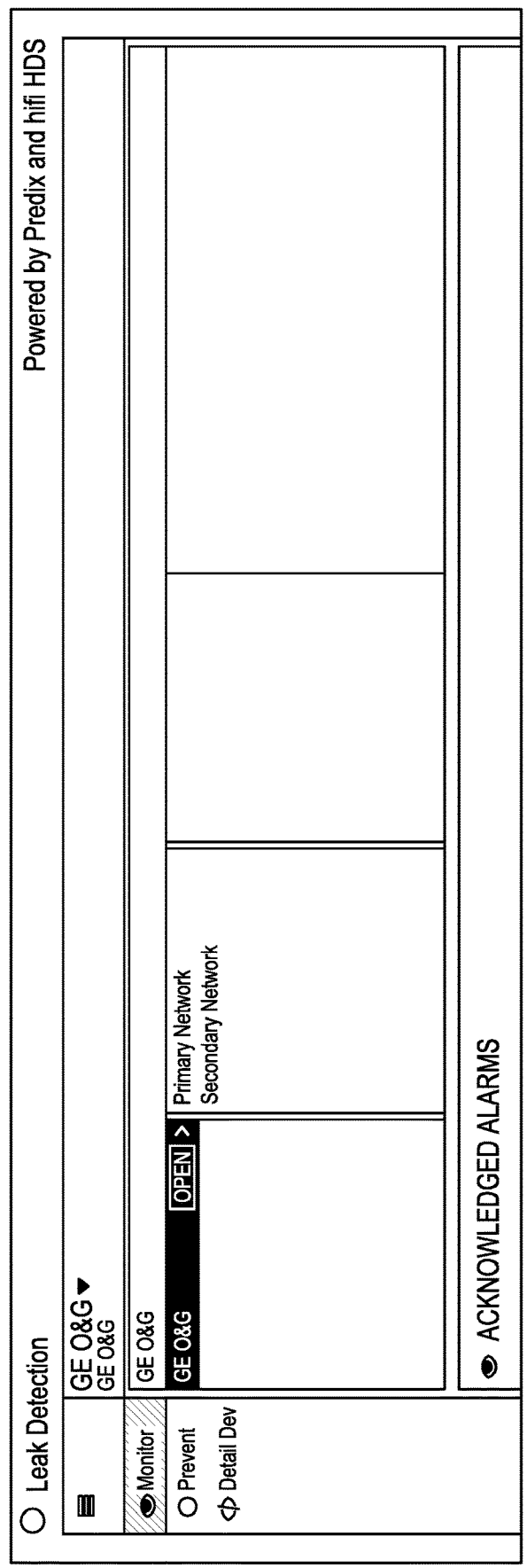
FIG. 15 illustrates an exemplary embodiment of a context browser of a user interface of a pipeline management system.
Figure 16:
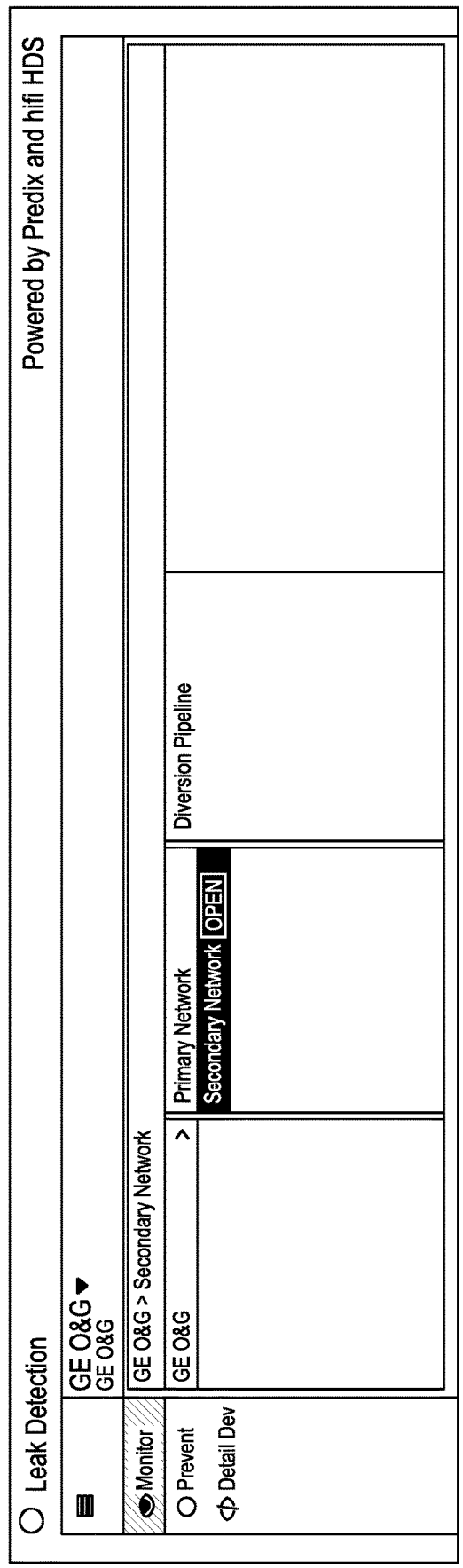
FIG. 16 illustrates the context browser of FIG. 15 after selection of an item displayed thereon.

FIG. 15 illustrates a context browser of the user interface that can allow a user to navigate through a hierarchical menu in order to switch the context of the overall view of the user interface. The context browser is collapsed by default. In the default collapsed state, the context browser only shows the selected context, which is "GE O&G" at the top of the window in larger font in this illustrated embodiment, and its parent node, which is "GE O&G" in smaller font below the selected context in this illustrated embodiment. The context browser also includes a selector for switching views. The selector in this illustrated embodiment is an arrow (the solid black arrow next to the selected context), although other forms can be used as will be appreciated by a person skilled in the art. When a user clicks on or otherwise selects the title or arrow, the context browser expands from its default collapsed state to an expanded state which covers cards and other content on the page. The context browser in this illustrated embodiment uses Miller Columns, a pattern similar to that used in the Mac OS X "Finder" application, to represent a hierarchical tree structure using side-by-side drill-down panels. Selecting an item in the expanded context browser causes children of the selected item to show up in the next panel over, and also causes a selection icon (e.g., a button, etc.) to appear within the selected row to allow the user to submit/save that context, which also re-collapses the browser. FIG. 15 shows the context browser in the expanded state with the "GE O&G" item selected and highlighted such that the next panel over appears listing networks associated with that selected item, which are "Primary Network" and "Secondary Network" in this illustrated embodiment. When the context browser collapses, new data is loaded with that context. For example, when "Secondary Network" in FIG. 15 is selected, e.g., by clicking on "Secondary Network" and clicking on the "OPEN" button that appears next to "Secondary Network," the Secondary Network and all of its children's data loads, as shown in FIG. 16.

Figure 25:
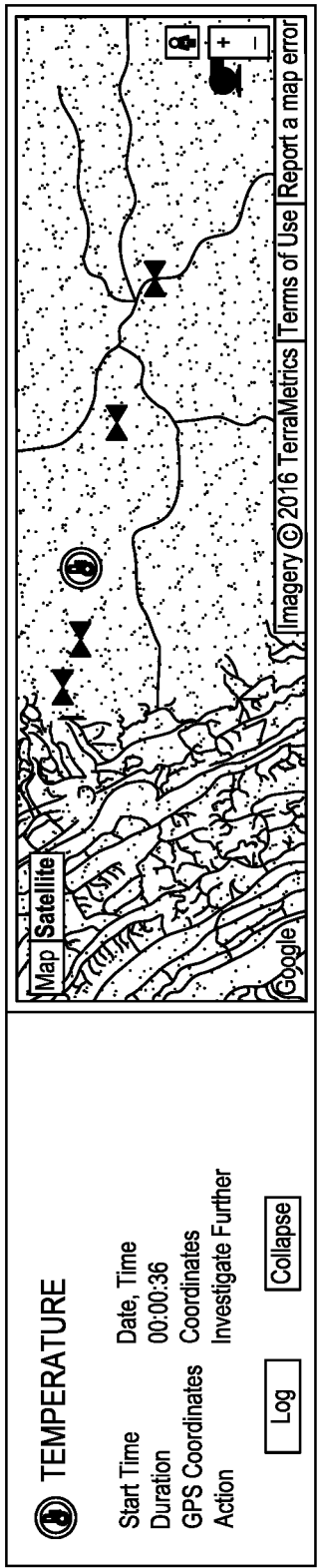
FIG. 25 illustrates yet another exemplary embodiment of a map visualization of an alarm card.
Figure 26:
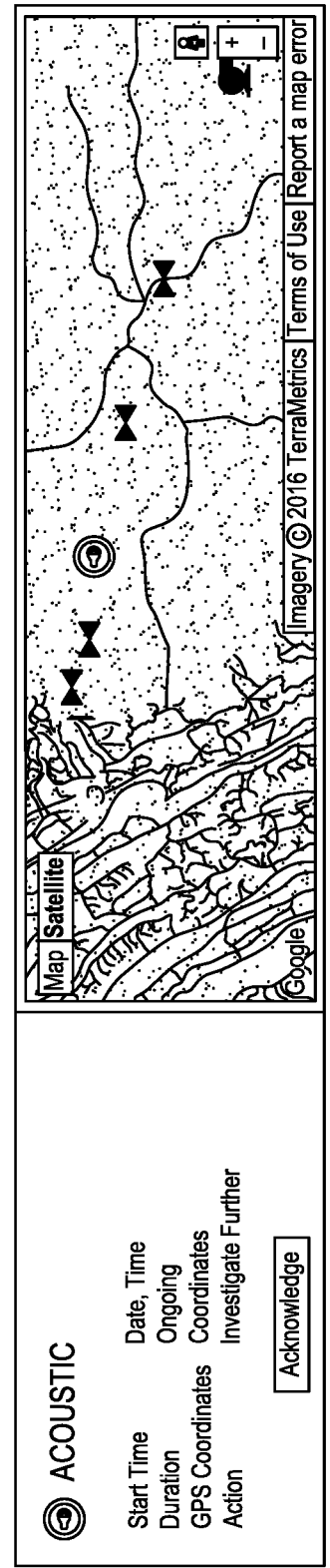
FIG. 26 illustrates still another exemplary embodiment of a map visualization of an alarm card.
Figure 27:
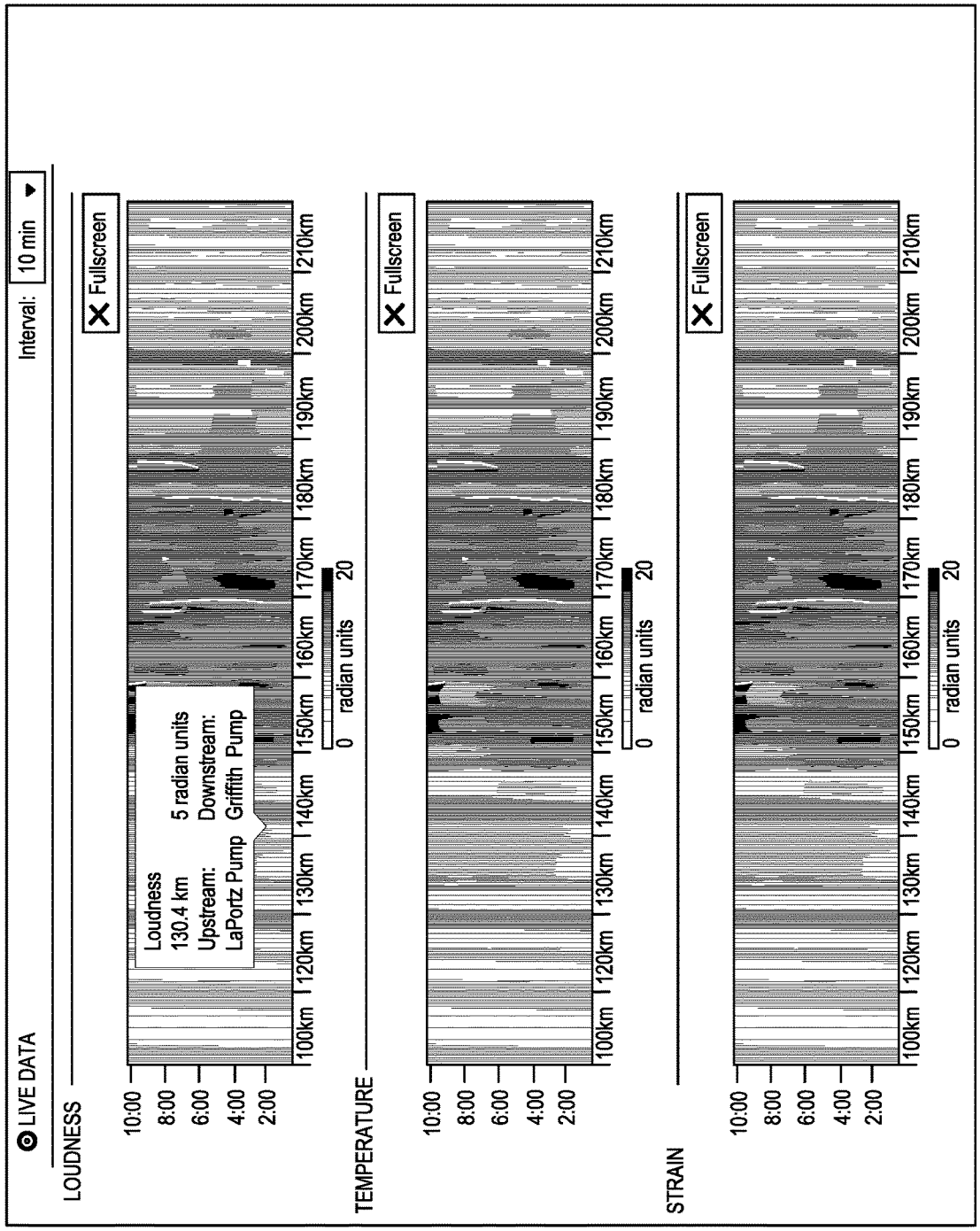
FIG. 27 illustrates an exemplary embodiment of a regular card showing live data.

FIGS. 17-28 illustrate various embodiments of cards that can be shown on the user interface. FIGS. 17-26 illustrate various aspects of alarm cards providing information regarding an alarm, and FIGS. 27 and 28 illustrate various aspects of regular cards providing information when there is no alarm.

As in this illustrated embodiment, all of the information shown on alarm cards are relevant to the specific alarm, which may allow for a user to quickly analyze the alarm and more quickly take steps to resolve the anomalous event. The alarm card can allow the user to access more detailed data if desired, which may help a user resolve a particularly difficult problem and/or make a more informed decision on any steps to be taken in response to the alarm.

Figure 17:
FIG. 17 illustrates an exemplary embodiment of an unacknowledged context for an alarm card in the user interface of FIG. 15.
Figure 18:
FIG. 18 illustrates an exemplary embodiment of an acknowledged context for an alarm card in the user interface of FIG. 15.

Alarm cards can have two contexts, each of which displays a different array of selectable options (e.g., buttons, etc.) on the alarm card. FIG. 17 illustrates an unacknowledged context of an alarm card for alarms that have not yet been acknowledged by a user, and includes an "Acknowledge" selectable option to acknowledge the alarm and a "Detail" selectable option to view information regarding the alarm. FIG. 18 illustrates an acknowledged context of an alarm card for alarms that have been acknowledged by a user, and includes a "Log" selectable option to view logged information for that alarm, a "Detail" selectable option to view information regarding the alarm, and a "Collapse" selectable option to hide the alarm.

Figure 19:
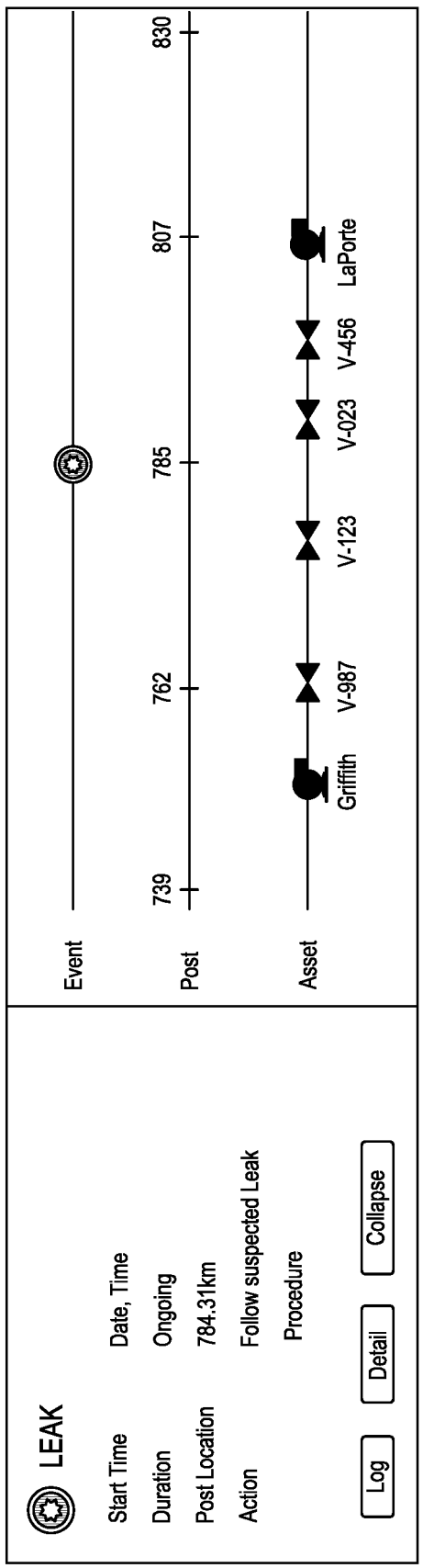
FIG. 19 illustrates an exemplary embodiment of an alarm card in an expanded state in the user interface of FIG. 15.
Figure 20:
FIG. 20 illustrates an exemplary embodiment of the alarm card of FIG. 19 in a collapsed state.

Alarm cards can have two viewable states, an expanded state and a collapsed state. An alarm card cannot be viewed in the expanded state until the alarm has been acknowledged. FIG. 19 illustrates an embodiment of an alarm card for a "leak" alarm in an expanded state. FIG. 20 illustrates the alarm card of FIG. 19 in an embodiment of a collapsed state.

Figure 21:
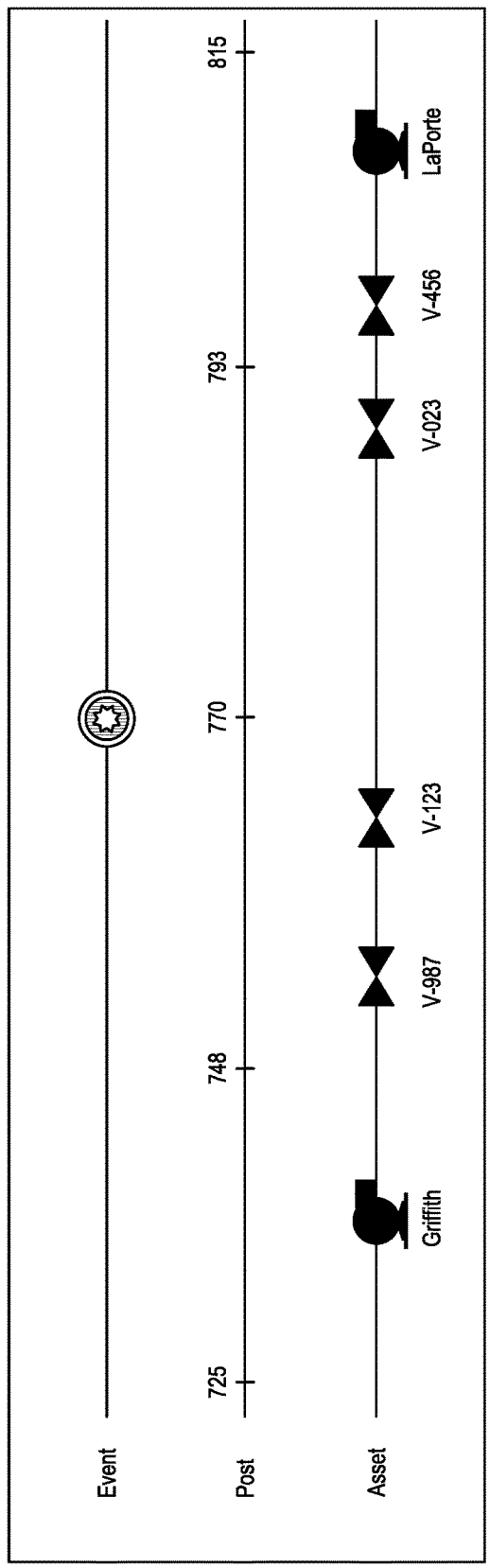
FIG. 21 illustrates an exemplary embodiment of a schematic visualization of an alarm card.
Figure 22:
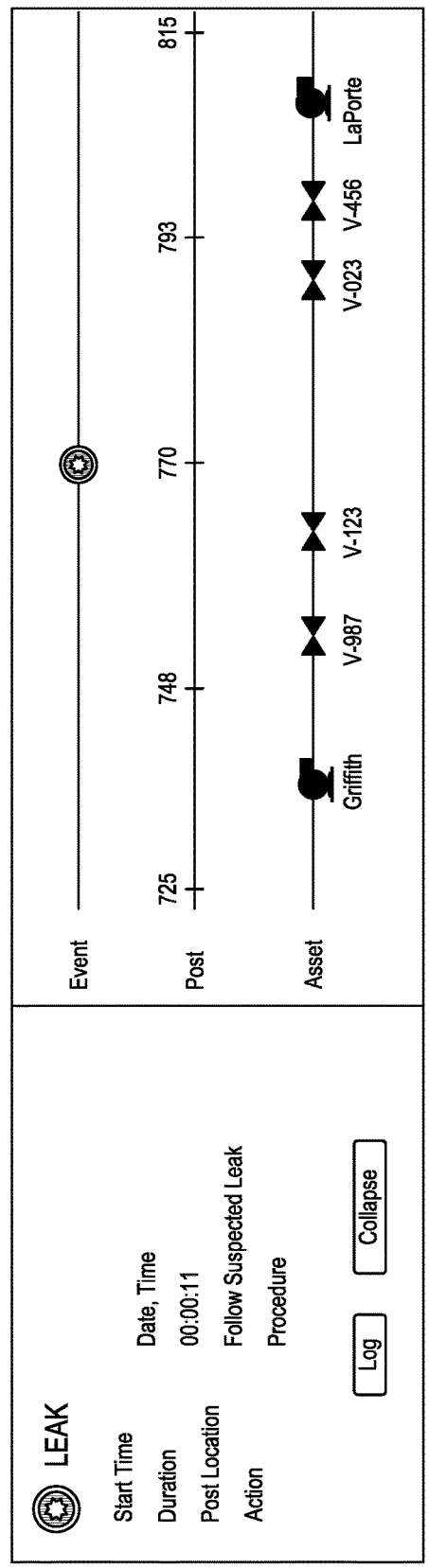
FIG. 22 illustrates the alarm card of FIG. 21.
Figure 39:
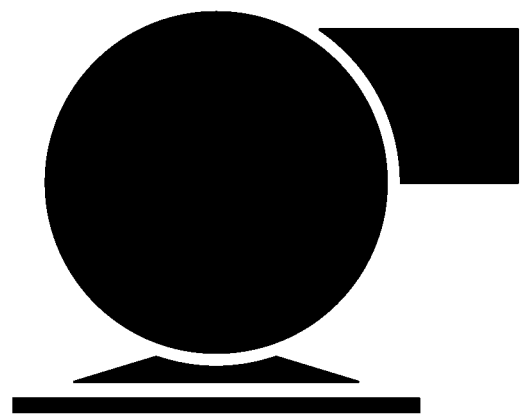
FIG. 39 illustrates an exemplary embodiment of a valve icon.
Figure 40:
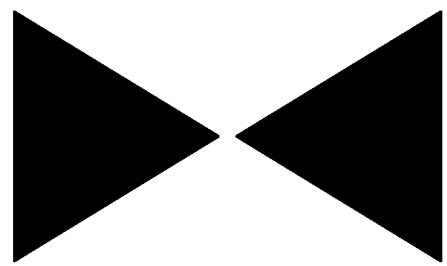
FIG. 40 illustrates an exemplary embodiment of a pump icon.

An alarm card can have a schematic configuration, which may help a user take appropriate action in response to the alarm. For example, a "leak" alarm can display a pipeline schematic so a user can see nearby assets. The appropriate action to take in response to a leak can vary. Since control rooms typically have very specific procedures set up to handle leaks, the appropriate action that is triggered can be to begin the set up leak handling procedure for the specific pipeline at issue. The schematic configuration provides post location, as opposed to GPS coordinates, in order to give a user the best estimate as to where the alarm has occurred along the pipeline. A map configuration of an alarm card, discussed further below, provides GPS coordinates and not post location. FIG. 21 illustrates an embodiment of a schematic configuration of a portion of an alarm card, which is shown in FIG. 22 including the portion of FIG. 21. The alarm card of FIG. 19 has a similar schematic configuration. As shown in FIGS. 19, 21, and 22, the schematic configuration includes a schematic visualization with three types of information, which are organized on three lines in this illustrated embodiment. The first type of information is event information that marks a location of the alarm event with an icon on a center of a line. The icon is a unique symbol uniquely identifying the anomalous event, in this case a red star icon (also shown in FIG. 34) for a leak. The color red is an intense icon color and is thus used for leak alarms as an indicator of urgency that action should be taken immediately. The second type of information is post information showing a distance that is determined by a length of the furthest pump, with that distance mirrored on the other side of the event. Some padding on the lines on either side of the event is provided in order for the pumps to not be right on the edge of the visualization. The third type of information is asset information showing assets along the post line. In the illustrated embodiment of FIGS. 21 and 22, two valves (valve icons labeled V-987 and V-123) are on a first, left side of the event, two valves (valve icons labeled V-023 and V-456) are on a second, right side of the event, one pump (pump icon labeled Griffith) is on the first side of the event, and one pump (pump icons labeled LaPorte) is on the second side of the event. The valve icon is shown in FIG. 39, and the pump icon is shown in FIG. 40. The two pumps serve as bookends for the schematic and are the closest pumps to the event. There may be more assets between the two pumps, but they are not shown because valves and pumps are the most actionable assets to display. In other embodiments, the additional assets may be shown to provide the user with a more complete understanding of the pipeline's assets closest to the alarm event.

An alarm card can have a map configuration, which may provide a user with spatial awareness for the alarm. For example, for an "intrusion" alarm, it is valuable for a user to see where, on a map, the intrusion is occurring. The appropriate action to take in response to an intrusion can vary. Since there will usually be a field technician or other person out in the field, the appropriate action that is triggered can be to call the field technician or other person in the field nearest the event to investigate the possible intrusion in person.

Figure 23:
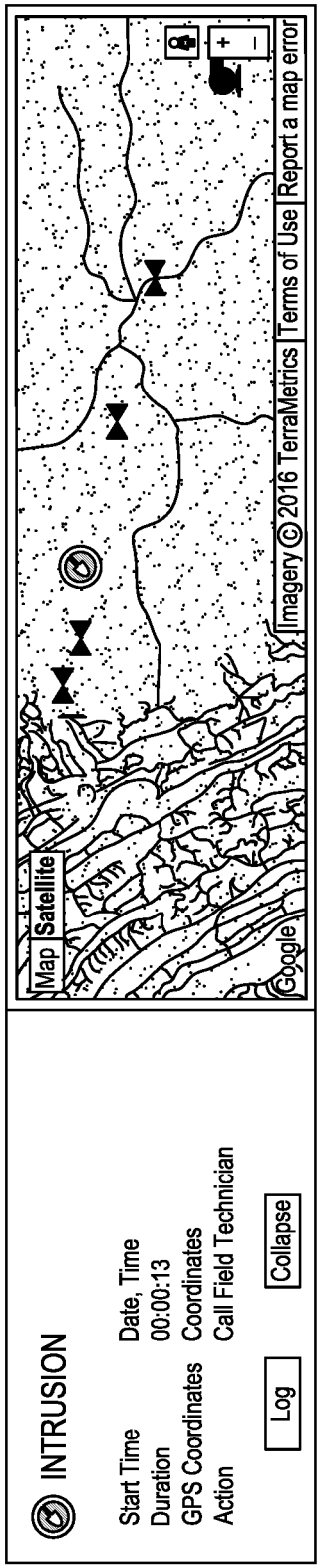
FIG. 23 illustrates an exemplary embodiment of a map visualization of an alarm card.

FIG. 23 illustrates an embodiment of a map configuration of an alarm card. As shown in FIG. 23, the schematic configuration includes a schematic visualization with two types of information, which are organized overlaid on a satellite map view in this illustrated embodiment. The map view can be overlaid on a map view instead, as selected by the user via, e.g., map/satellite buttons. The first type of information is event information that marks a location of the alarm event with an icon on the map. The icon is a unique symbol uniquely identifying the anomalous event, in this case a yellow shovel icon (also shown in FIG. 35) for an intrusion. The color yellow is a less intense icon color than red and is thus used for an alarm type less urgent than a "red" alarm type as an indicator that action should be taken quickly but not necessarily immediately. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

Figure 24:
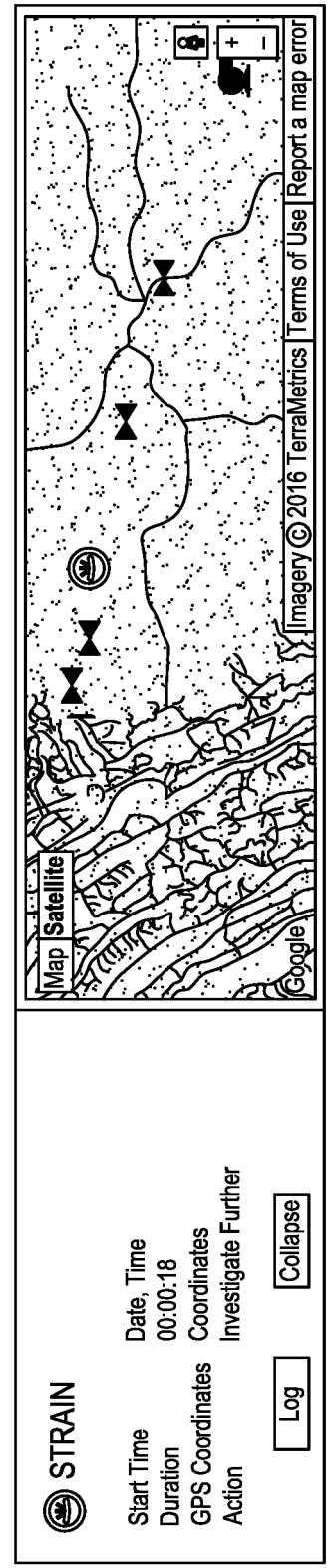
FIG. 24 illustrates another exemplary embodiment of a map visualization of an alarm card.

FIG. 24 illustrates another embodiment of a map configuration of an alarm card. As shown in FIG. 24, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue stress icon (also shown in FIG. 36) for a strain. The color blue is a less intense icon color than yellow and is thus used for an alarm type less urgent than a "yellow" alarm type as an indicator that action, such as an investigation of additional information via the alarm card's "Detail" button, should be taken as a preventative measure without action needing to be taken immediately. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 25 illustrates another embodiment of a map configuration of an alarm card. As shown in FIG. 25, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue thermometer icon (also shown in FIG. 37) for a problematic measured temperature, such as a temperature above a predetermined threshold temperature, a temperature below a predetermined threshold temperature, or a temperature outside a predetermined temperature range. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 26 illustrates another embodiment of a map configuration of an alarm card. As shown in FIG. 26, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue sound icon (also shown in FIG. 38) for a problematic measured noise, such as a noise above a predetermined threshold decibel level or a noise within a predetermined noise range that is typically indicative of an anomaly. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 27 illustrates an embodiment of a regular card that shows live data. In other words, the regular card of FIG. 27 shows collected data in real time. The live data in this illustrated embodiment includes acoustic (loudness) data, temperature data, and strain data.

FIG. 28 illustrates an embodiment of a regular card that shows logged alarm data. In this illustrated embodiment, the logged alarm data for each alarm in the log includes an event ID, an event type, a start time of the event, an end time of the event, a duration of the event, when the event was acknowledged, when the event was logged, a post of the event, GPS coordinates of the event, and a "View" selectable icon to view any user-entered comments for that event.

Figure 29A:
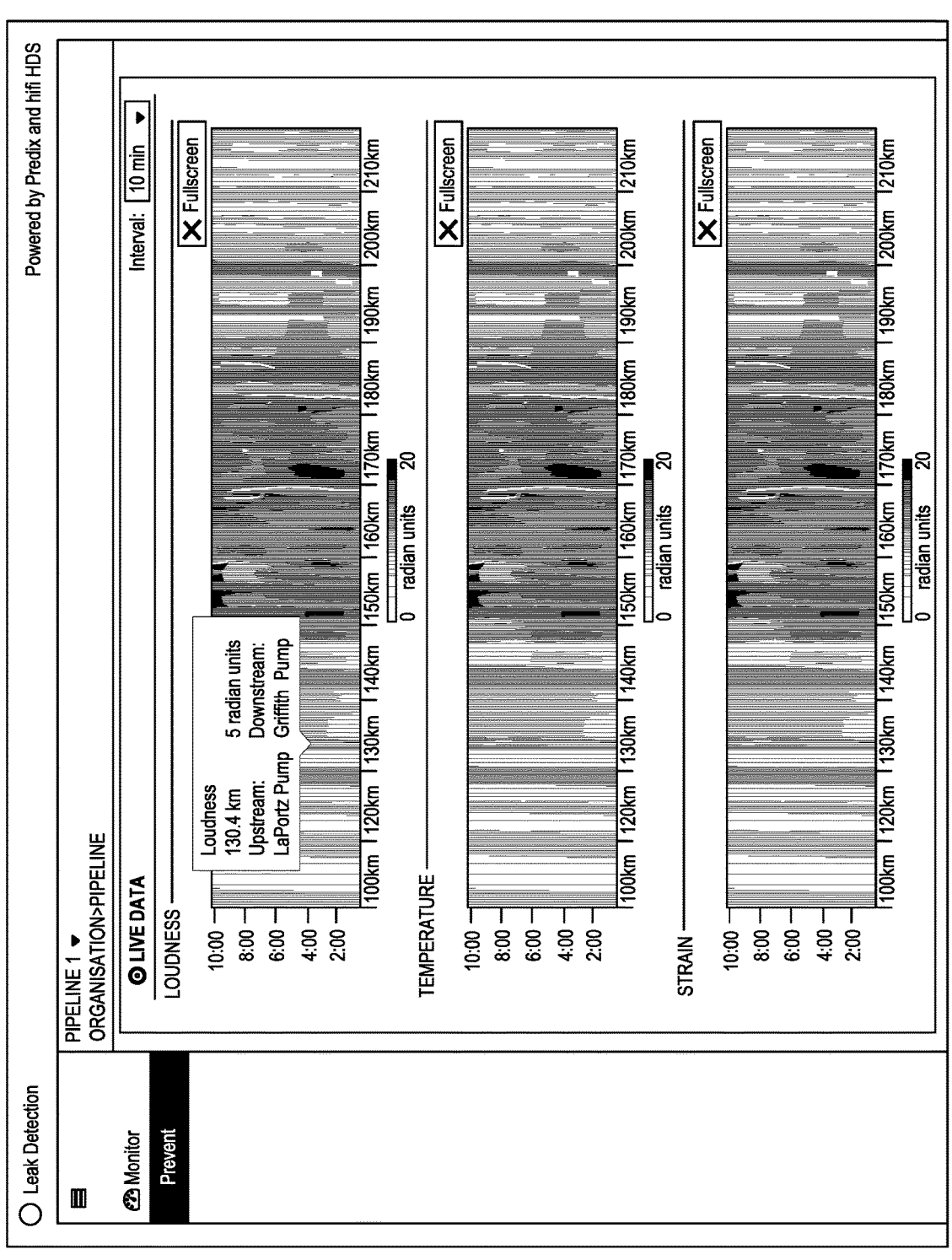
FIG. 29A illustrates a top portion of an exemplary embodiment of the user interface of FIG. 15 including the regular cards of FIGS. 27 and 28.

FIGS. 29A-29B show a full screen view of the user interface including the live data regular card of FIG. 27, the logged data regular card of FIG. 28, and the user interface's side bar with user-selectable menu options for a "Monitor View" and a "Prevent" view. The "Prevent" view is selected in FIGS. 29A-29B.

The full screen view of FIGS. 29A-29B shows the user interface in a non-critical, "lights on" mode in which the cards on the screen have a light background, white in this illustrated embodiment. The non-critical mode reflects that non-mission critical information is currently being shown on the screen. In the non-critical mode, no information about alarms is displayed. Examples of non-critical information include data that allows for proactive analysis (such as live data and logged data), user management data, company management data, and user interface settings or configuration.

Figure 30:
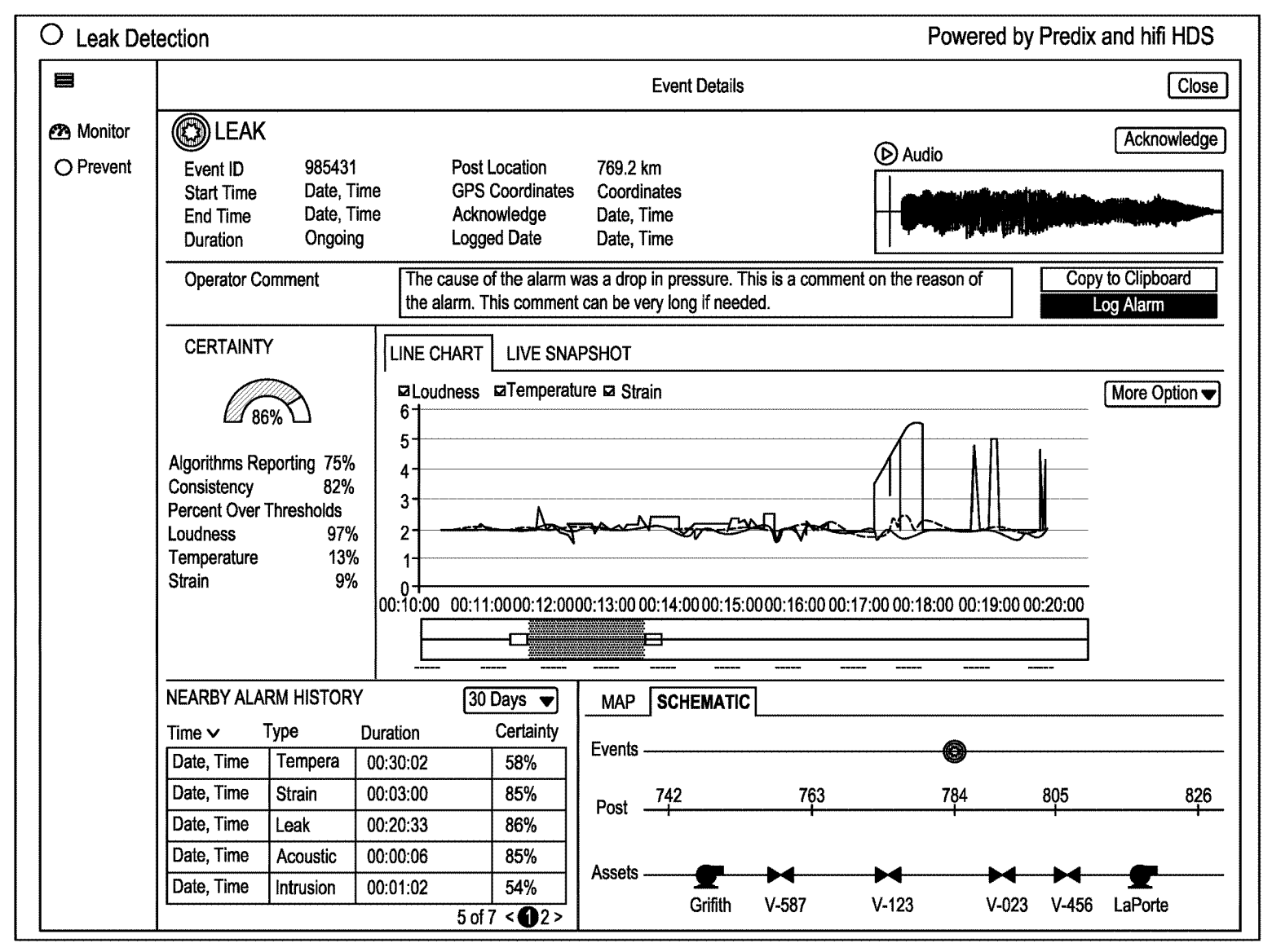
Figure 31:
FIG. 31 illustrates another exemplary embodiment of the user interface of FIG. 15 in full screen view.
Figure 32:
FIG. 32 illustrates a portion of the user interfaces of FIGS. 30 and 31.
Figure 33:
FIG. 33 illustrates an embodiment of an alarm icon of the user interface of FIG. 15.
Figure 34:
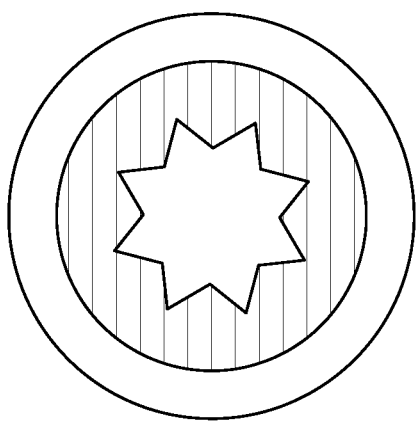
FIG. 34 illustrates an exemplary embodiment of a leak icon.
Figure 35:
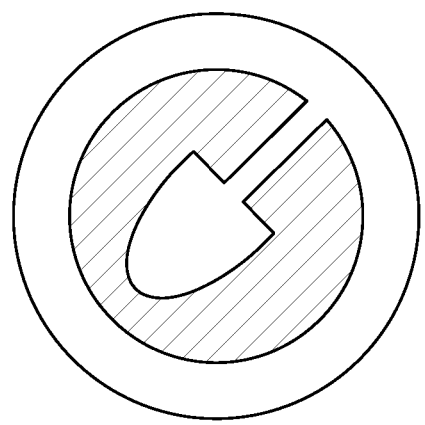
FIG. 35 illustrates an exemplary embodiment of an intrusion icon.
Figure 36:
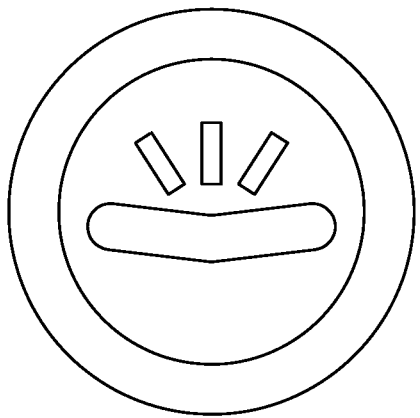
FIG. 36 illustrates an exemplary embodiment of a strain icon.
Figure 37:
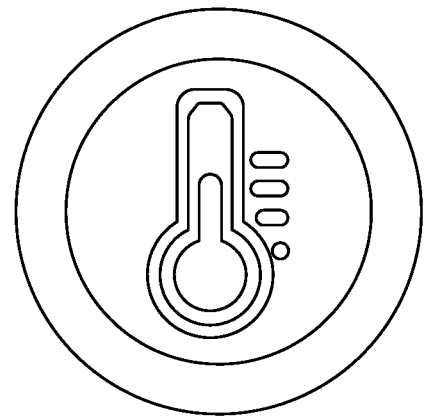
FIG. 37 illustrates an exemplary embodiment of a temperature icon.
Figure 38:
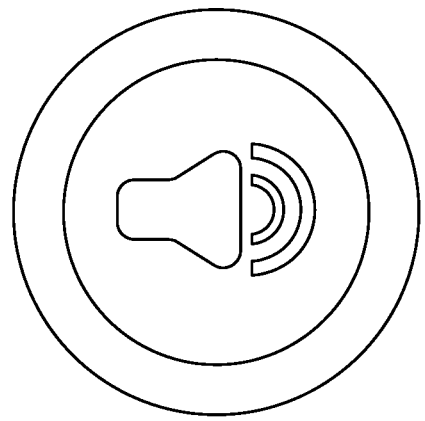
FIG. 38 illustrates an exemplary embodiment of an acoustic icon.

A full screen view on the user interface can be in critical, "lights off" mode in which cards on the screen have a dark background, dark gray in this illustrated embodiment. The critical mode reflects that mission critical information is currently being shown on the screen. Having color-coded critical and non-critical modes may help a user quickly determine the criticality of information on the screen and the urgency with which the user should review the information. Examples of critical information include alarm data, including alarm cards, alarm details, and alarm analysis. FIG. 30 shows an embodiment of the user interface in full screen view in critical mode. FIG. 31 shows another embodiment of the user interface in full screen view in critical mode. FIGS. 30 and 31 each include an alarm card showing information regarding an acknowledged leak alarm (different leaks alarms are shown in FIGS. 30 and 31). In each of FIGS. 30 and 31, the alarm icon is in color, which in this illustrated embodiment for a leak is the red leak icon of FIGS. 32 and 34, to indicate that the alarm still needs action to be taken by a user. Once the user has trigged one or more corrective actions in response to the alarm, the alarm icon is no longer in color and is shaded in the screen's background color, which is dark gray as shown in FIG. 33. The alarm icon being color-coded based on whether or not action still needs to be taken by a user may help the user quickly determine high-priority items for review and action. As discussed above, different types of alarms can be color-coded by urgency (e.g., red for highest urgency, blue for lowest urgency, and yellow for intermediate urgency), which may further help the user quickly determine high-priority items for review and action if multiple alarms are shown on the user interface.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The devices, systems, and methods disclosed herein produce a number of advantages and/or technical effects in addition to or in alternative to any one or more of those discussed above. As an example, maintaining one database (e.g., in a cloud) for event file data of all clients of a pipeline management system may reduce costs and/or improve efficiency of managing the database of the pipeline management system. As another example, allowing a user to have access to user credentials data for all users across all the clients may encourage consistency across the database and/or simplify debugging. As yet another example, allowing a user to have access to user credentials data for all users across only a subset of the clients (e.g., for a single client with which the user is associated) may allow client-specific customization. As still another example, allowing a user to set credentials for other users at a level equal to or below the user's level may facilitate user database management and/or help prevent unauthorized users from gaining too much database control through the setting of a user level that is too-high.

Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A pipeline management system, comprising:
  a memory storing instructions;
  a display configured to show a user interface thereon; and
  a processor configured to execute the instructions in the memory, wherein the processor is, based on the executed instructions, further configured to:
    receive acoustic data, temperature data and strain data sensed at a pipeline with fluid flowing therethrough;
    determine one or more of a leak alarm, an intrusion alarm, a strain alarm, an acoustic event alarm and a temperature change alarm indicative of one or more of a leak, an intrusion, a strain, an acoustic event and a temperature change, respectively, of the pipeline from the received acoustic data, temperature data and strain data sensed at the pipeline;
    receive data indicative of identity of a logged-in user of the user interface associated with a monitoring system of the pipeline;
    identify, based on the identity of the logged-in user and a predetermined credential of the logged-in user, a first portion of the received acoustic data, temperature data and strain data and a second portion of the determined one or more of the leak alarm, the intrusion alarm, the strain alarm, the acoustic event alarm and the temperature change alarm, and
    present the first portion of the received acoustic data, temperature data and strain data and the second portion of the determined one or more of the leak alarm, the intrusion alarm, the strain alarm, the acoustic event alarm and the temperature change alarm on the user interface.

2. The system of claim 1, wherein the processor is configured to determine which of the data is associated with the logged-in user based on a hierarchical role of the user.

3. The system of claim 1, wherein the processor is, based on the executed instructions, further configured to
  receive a request from the user via the user interface requesting a credential level edit of another user of the user interface, determine whether the user has a credential level allowing the request to be implemented, and in response to determining that the user has a credential level allowing the request to be implemented, change the credential level of the other user.

4. The system of claim 1, wherein the fluid flowing through the pipeline includes one of natural gas and petroleum.

5. The system of claim 1, further comprising a client terminal that includes the display, wherein the client terminal includes one of a desktop computer, a workstation, a minicomputer, a laptop computer, a tablet computer, and a smart mobile phone.

6. A pipeline management method, comprising:

receiving acoustic data, temperature data and strain data sensed at a pipeline with fluid flowing therethrough, wherein the one or more parameters include one or more of acoustic data, temperature data and strain data;

determining one or more of a leak alarm, an intrusion alarm, a strain alarm, an acoustic event alarm and a temperature change alarm indicative of one or more of a leak, an intrusion, a strain, an acoustic event and a temperature change, respectively, of the pipeline from the received acoustic data, temperature data and strain data sensed at the pipeline;

receiving data indicative of identity of a logged-in user of the user interface associated with a monitoring system of the pipeline;

identifying, based on the identity of the logged-in user and a predetermined credential of the logged-in user, a first portion of the received acoustic data, temperature data and strain data and a second portion of the determined one or more of the leak alarm, the intrusion alarm, the strain alarm, the acoustic event alarm and the temperature change alarm, and presenting the first portion of the received acoustic data, temperature data and strain data and the second portion of the determined one or more of the leak alarm, the intrusion alarm, the strain alarm, the acoustic event alarm and the temperature change alarm on the user interface.

7. The method of claim 6, wherein determining which of the data is associated with the logged-in user is based on a hierarchical role of the user.

8. The method of claim 6, further comprising:

receiving a request from the user via the user interface requesting a credential level edit of another user of the user interface;

determining whether the user has a credential level allowing the request to be implemented; and in response to determining that the user has a credential level allowing the request to be implemented, changing the credential level of the other user.

9. The method of claim 6, wherein the fluid flowing through the pipeline includes one of natural gas and petroleum.

10. The method of claim 6, wherein the user interface is shown on a display, and a processor performs the receiving, the determining, and the causing by executing instructions stored in a memory.

11. The method of claim 10, wherein a client terminal includes the display, and the client terminal includes one of a desktop computer, a workstation, a minicomputer, a laptop computer, a tablet computer, and a smart mobile phone.

12. A non-transitory computer program product storing instructions, which when executed by a processor, implements operations comprising:

receiving acoustic data, temperature data and strain data sensed at a pipeline with fluid flowing therethrough;

determining one or more of a leak alarm, an intrusion alarm, a strain alarm, an acoustic event alarm and a temperature change alarm indicative of one or more of a leak, an intrusion, a strain, an acoustic event and a temperature change, respectively, of the pipeline from the received acoustic data, temperature data and strain data sensed at the pipeline;

receiving data indicative of identity of a logged-in user of the user interface associated with a monitoring system of the pipeline;

identifying, based on the identity of the logged-in user and a predetermined credential of the logged-in user, a first portion of the received acoustic data, temperature data and strain data and a second portion of the determined one or more of the leak alarm, the intrusion alarm, the strain alarm, the acoustic event alarm and the temperature change alarm; and presenting the first portion of the received acoustic data, temperature data and strain data and the second portion of the determined one or more of a leak alarm, an intrusion alarm, a strain alarm, an acoustic event alarm and a temperature change alarm on the user interface.

13. The computer program product of claim 12, wherein determining which of the data is associated with the logged-in user is based on a hierarchical role of the user.

14. The computer program product of claim 12, wherein the instructions, when executed by a processor, implements operations further comprising:

receiving a request from the user via the user interface requesting a credential level edit of another user of the user interface;

determining whether the user has a credential level allowing the request to be implemented; and in response to determining that the user has a credential level allowing the request to be implemented, changing the credential level of the other user.

15. The computer program product of claim 12, wherein the fluid flowing through the pipeline includes one of natural gas and petroleum.

16. The computer program product of claim 12, wherein the user interface is shown on a display.

17. The computer program product of claim 16, wherein a client terminal includes the display, and the client terminal includes one of a desktop computer, a workstation, a minicomputer, a laptop computer, a tablet computer, and a smart mobile phone.

18. The system of claim 1, wherein the processor is further configured to:

present, based on the identity of the logged-in user and the predetermined credential of the logged-in user, on the user interface the following:

a start time, a duration,

GPS coordinates or a post location, an action, and a map, a satellite image or a schematic diagram, wherein each of the start time, the duration, the GPS coordinates or the post location, the action, and the map, the satellite image or the schematic diagram includes information related to the determined one or more of the leak alarm, the intrusion alarm, the strain alarm, the acoustic event alarm and the temperature change alarm.

19. The method of claim 6, further comprising:
presenting, based on the identity of the logged-in user and the predetermined credential of the logged-in user, on the user interface the following:
a start time,
a duration,
GPS coordinates or a post location,
an action, and
a map, a satellite image or a schematic diagram,
wherein each of the start time, the duration, the GPS coordinates or the post location, the action, and the map, the satellite image or the schematic diagram includes information related to the determined one or more of the leak alarm, the intrusion alarm, the strain alarm, the acoustic event alarm and the temperature change alarm.

20. The computer program product of claim 12, wherein the operations further comprise:
presenting, based on the identity of the logged-in user and the predetermined credential of the logged-in user, on the user interface the following:
a start time,
a duration,
GPS coordinates or a post location,
an action, and
a map, a satellite image or a schematic diagram,
wherein each of the start time, the duration, the GPS coordinates or the post location, the action, and the map, the satellite image or the schematic diagram includes information related to the determined one or more of the leak alarm, the intrusion alarm, the strain alarm, the acoustic event alarm and the temperature change alarm.

\* \* \* \* \*